US010828587B2

(12) United States Patent
Doucouré et al.

(10) Patent No.: US 10,828,587 B2
(45) Date of Patent: Nov. 10, 2020

(54) STABLE FILTER MEDIA INCLUDING NANOFIBERS

(71) Applicant: Hollingsworth & Vose Company, East Walpole, MA (US)

(72) Inventors: Abdoulaye Doucouré, Roanoke, VA (US); Randall B. Keisler, Clifton Park, NY (US)

(73) Assignee: Hollingsworth & Vose Company, East Walpole, MA (US)

( * ) Notice: Subject to any disclaimer, the term of this patent is extended or adjusted under 35 U.S.C. 154(b) by 381 days.

(21) Appl. No.: 14/690,345

(22) Filed: Apr. 17, 2015

(65) Prior Publication Data

US 2016/0303498 A1    Oct. 20, 2016

(51) Int. Cl.
*B01D 39/16* (2006.01)
*B01D 39/20* (2006.01)
*C02F 1/44* (2006.01)

(52) U.S. Cl.
CPC ..... *B01D 39/1623* (2013.01); *B01D 39/2017* (2013.01); *B01D 39/2065* (2013.01);
(Continued)

(58) Field of Classification Search
CPC ................ B01D 39/1623; B01D 39/16; B01D 39/2017; B01D 39/2065; B01D 39/1607;
(Continued)

(56) References Cited

U.S. PATENT DOCUMENTS 3,645,398 A    2/1972  Fiocco
3,847,821 A    11/1974 Krueger
(Continued)

FOREIGN PATENT DOCUMENTS

CA    2821528 A1    5/2006
CN    1044290 A     8/1990
(Continued)

OTHER PUBLICATIONS

International Search Report and Written Opinion for PCT/US16/27422 dated Jul. 11, 2016.
(Continued)

*Primary Examiner* — Katherine Zalasky McDonald
(74) *Attorney, Agent, or Firm* — Wolf, Greenfield & Sacks, P.C.

(57) ABSTRACT

Filter media comprising nanofibers and related components, systems, and methods associated therewith are provided. In some embodiments, a filter media may comprise a first fiber web and a second fiber web designed to impart beneficial properties to the filter media. For instance, in some embodiments, the first fiber web may provide high particulate efficiency and the second fiber web may provide suitable capacity. In some embodiments, the first and second fiber webs may have certain properties (e.g., water contact angle, surface energy) that are similar or substantially the same. The similarities between the first and second fiber webs may serve to enhance the structural stability of the filter media under various conditions (e.g., high temperature, high pressure, steam sterilization) and/or permeability to certain fluids (e.g., water). Filter media, as described herein, may be particularly well-suited for applications that involve liquid filtration.

29 Claims, 3 Drawing Sheets

(52) U.S. Cl.
CPC ............ *B01D 2239/0421* (2013.01); *B01D 2239/0428* (2013.01); *B01D 2239/065* (2013.01); *B01D 2239/0622* (2013.01); *B01D 2239/0631* (2013.01); *B01D 2239/1216* (2013.01); *B01D 2239/1233* (2013.01); *B01D 2239/1291* (2013.01); *C02F 1/44* (2013.01)

(58) Field of Classification Search
CPC .... B01D 2239/0421; B01D 2239/0622; B01D 2239/0631; B01D 2239/065; B01D 2239/1233; B01D 39/0428; B01D 39/1291; B01D 39/1216
See application file for complete search history.

(56) References Cited

U.S. PATENT DOCUMENTS

| | | | |
|---|---|---|---|
| 3,865,732 A | 2/1975 | Terhune et al. | |
| 3,943,063 A | 3/1976 | Morishita et al. | |
| 3,951,814 A | 4/1976 | Krueger | |
| 4,107,364 A | 8/1978 | Sisson | |
| 4,199,447 A | 4/1980 | Chambers et al. | |
| 4,468,428 A | 8/1984 | Early et al. | |
| 4,501,785 A | 2/1985 | Nakanishi | |
| 4,588,500 A | 5/1986 | Sprenger et al. | |
| 4,604,205 A | 8/1986 | Ayers | |
| 4,618,388 A | 10/1986 | Ayers | |
| 4,623,560 A | 11/1986 | Ayers | |
| 4,650,506 A | 3/1987 | Barris et al. | |
| 4,880,548 A * | 11/1989 | Pall ............... | A61M 1/3633 210/435 |
| 4,888,117 A | 12/1989 | Brown et al. | |
| 4,892,667 A | 1/1990 | Parker, III et al. | |
| 4,921,612 A | 5/1990 | Sirkar | |
| 4,925,572 A * | 5/1990 | Pall ............... | A61M 1/3633 210/435 |
| 4,995,974 A | 2/1991 | Lorey et al. | |
| 5,053,132 A | 10/1991 | Sirkar | |
| 5,156,905 A | 10/1992 | Bagrodia et al. | |
| 5,269,925 A | 12/1993 | Broadhurst | |
| 5,275,859 A | 1/1994 | Phillips et al. | |
| 5,294,338 A | 3/1994 | Kamo et al. | |
| 5,356,704 A | 10/1994 | Phillips et al. | |
| 5,443,724 A | 8/1995 | Williamson et al. | |
| 5,472,600 A * | 12/1995 | Ellefson ............ | B01D 39/083 210/317 |
| 5,480,547 A | 1/1996 | Williamson et al. | |
| 5,503,746 A | 4/1996 | Gagnon | |
| 5,547,756 A | 8/1996 | Kamo et al. | |
| 5,580,459 A | 12/1996 | Powers et al. | |
| 5,580,692 A | 12/1996 | Lofftus et al. | |
| 5,582,907 A * | 12/1996 | Pall ............... | B01D 39/1623 428/304.4 |
| 5,629,367 A | 5/1997 | Lofftus et al. | |
| 5,672,399 A | 9/1997 | Kahlbaugh et al. | |
| 5,785,725 A | 7/1998 | Cusick et al. | |
| 5,855,788 A * | 1/1999 | Everhart ............ | A61L 2/022 210/490 |
| 6,074,869 A * | 6/2000 | Pall ............... | B01D 61/18 422/429 |
| 6,123,752 A | 9/2000 | Wu et al. | |
| 6,171,684 B1 | 1/2001 | Kahlbaugh et al. | |
| 6,224,768 B1 | 5/2001 | Navarre et al. | |
| 6,352,947 B1 | 3/2002 | Haley et al. | |
| 6,395,046 B1 | 5/2002 | Emig et al. | |
| 6,395,184 B1 | 5/2002 | Bukhtiyarov et al. | |
| 6,422,395 B1 | 7/2002 | Verdegan et al. | |
| 6,422,396 B1 | 7/2002 | Li et al. | |
| 6,537,614 B1 | 3/2003 | Wei et al. | |
| 6,554,881 B1 | 4/2003 | Healey | |
| 6,569,330 B1 | 5/2003 | Sprenger et al. | |
| 6,616,723 B2 | 9/2003 | Berger | |
| 6,696,373 B2 | 2/2004 | Kinn et al. | |
| 6,743,273 B2 | 6/2004 | Chung et al. | |
| 6,802,315 B2 | 10/2004 | Gahan et al. | |
| 6,855,173 B2 | 2/2005 | Ehrnsperger et al. | |
| 6,914,040 B2 | 7/2005 | Deak et al. | |
| 6,924,028 B2 | 8/2005 | Chung et al. | |
| 6,942,711 B2 | 9/2005 | Faulkner et al. | |
| 6,955,775 B2 | 10/2005 | Chung et al. | |
| 7,008,465 B2 | 3/2006 | Graham et al. | |
| 7,070,640 B2 | 7/2006 | Chung et al. | |
| 7,084,099 B2 | 8/2006 | Radomyselski et al. | |
| 7,090,715 B2 | 8/2006 | Chung et al. | |
| 7,137,510 B1 | 11/2006 | Klein et al. | |
| 7,179,317 B2 | 2/2007 | Chung et al. | |
| 7,241,728 B2 | 7/2007 | Radomyselski et al. | |
| 7,244,291 B2 | 7/2007 | Spartz et al. | |
| 7,258,797 B2 | 8/2007 | Burton et al. | |
| 7,270,693 B2 | 9/2007 | Chung et al. | |
| 7,309,372 B2 | 12/2007 | Kahlbaugh et al. | |
| 7,314,497 B2 | 1/2008 | Kahlbaugh et al. | |
| 7,316,723 B2 | 1/2008 | Chung et al. | |
| 7,318,852 B2 | 1/2008 | Chung et al. | |
| 7,318,853 B2 | 1/2008 | Chung et al. | |
| 7,326,272 B2 | 2/2008 | Hornfeck et al. | |
| 7,413,657 B1 | 8/2008 | Thundyil et al. | |
| 7,527,739 B2 | 5/2009 | Jiang et al. | |
| 7,584,860 B2 | 9/2009 | Olson | |
| 7,754,123 B2 | 7/2010 | Verdegan et al. | |
| 7,824,550 B2 | 11/2010 | Abreu et al. | |
| 7,887,704 B2 | 2/2011 | Jiang et al. | |
| 7,938,963 B2 | 5/2011 | Klein et al. | |
| 7,985,344 B2 | 7/2011 | Dema et al. | |
| 7,987,996 B2 | 8/2011 | Ohashi et al. | |
| 7,988,860 B2 | 8/2011 | Kalayci et al. | |
| 8,017,011 B2 | 9/2011 | Ellis et al. | |
| 8,021,455 B2 | 9/2011 | Adamek et al. | |
| 8,021,457 B2 | 9/2011 | Dema et al. | |
| 8,029,588 B2 | 10/2011 | Chung et al. | |
| 8,057,567 B2 | 11/2011 | Webb et al. | |
| 8,114,183 B2 | 2/2012 | Schwandt et al. | |
| 8,118,901 B2 | 2/2012 | Chung et al. | |
| 8,118,910 B2 | 2/2012 | Farzana et al. | |
| 8,172,092 B2 | 5/2012 | Green et al. | |
| 8,177,984 B2 | 5/2012 | Stanfel et al. | |
| 8,263,214 B2 | 9/2012 | Kalayci et al. | |
| 8,268,033 B2 | 9/2012 | Rogers et al. | |
| 8,277,529 B2 | 10/2012 | Rogers et al. | |
| 8,360,251 B2 | 1/2013 | Wieczorek et al. | |
| 8,366,797 B2 | 2/2013 | Chung et al. | |
| 8,517,185 B2 | 8/2013 | Wieczorek et al. | |
| 8,535,404 B2 | 9/2013 | Crabtree et al. | |
| 8,636,833 B2 | 1/2014 | Jones et al. | |
| 8,641,796 B2 | 2/2014 | Rogers et al. | |
| 8,784,542 B2 | 7/2014 | Dullaert et al. | |
| 8,956,437 B2 | 2/2015 | Sealey et al. | |
| 9,149,748 B2 | 10/2015 | Nagy et al. | |
| 9,149,749 B2 | 10/2015 | Nagy et al. | |
| 9,220,998 B2 | 12/2015 | Seo et al. | |
| 10,080,985 B2 | 9/2018 | Nagy et al. | |
| 2002/0056684 A1 | 5/2002 | Klein | |
| 2002/0073849 A1 | 6/2002 | Buettner et al. | |
| 2003/0203696 A1 | 10/2003 | Healey | |
| 2005/0026526 A1 | 2/2005 | Verdegan et al. | |
| 2006/0060085 A1 * | 3/2006 | Ptak ............... | B01D 39/1623 96/69 |
| 2006/0090650 A1 * | 5/2006 | Yamakawa ........ | B01D 67/0009 96/11 |
| 2006/0094320 A1 | 5/2006 | Chen et al. | |
| 2006/0117730 A1 | 6/2006 | Chung et al. | |
| 2006/0137318 A1 | 6/2006 | Lim et al. | |
| 2006/0191249 A1 | 8/2006 | Gogins et al. | |
| 2006/0207234 A1 | 9/2006 | Ward et al. | |
| 2007/0012007 A1 | 1/2007 | Chung et al. | |
| 2007/0039300 A1 | 2/2007 | Kahlbaugh et al. | |
| 2007/0062887 A1 | 3/2007 | Schwandt et al. | |
| 2007/0084776 A1 | 4/2007 | Sasur | |
| 2007/0102372 A1 | 5/2007 | Ferrer et al. | |
| 2007/0271883 A1 | 11/2007 | Chung et al. | |
| 2007/0271891 A1 | 11/2007 | Chung et al. | |
| 2007/0283808 A1 | 12/2007 | Chung et al. | |
| 2008/0033106 A1 | 2/2008 | Koroskenyi et al. | |

(56) References Cited

U.S. PATENT DOCUMENTS

| | | |
|---|---|---|
| 2008/0073296 A1 | 3/2008 | Dema et al. |
| 2008/0110822 A1 | 5/2008 | Chung et al. |
| 2008/0197070 A1 | 8/2008 | Sirkar et al. |
| 2008/0257153 A1 | 10/2008 | Harp |
| 2008/0276805 A1 | 11/2008 | Lotgerink |
| 2008/0314821 A1 | 12/2008 | Ohashi et al. |
| 2009/0032475 A1 | 2/2009 | Ferrer et al. |
| 2009/0044702 A1 | 2/2009 | Adamek et al. |
| 2009/0050578 A1 | 2/2009 | Israel et al. |
| 2009/0065436 A1 | 3/2009 | Kalayci et al. |
| 2009/0120048 A1 | 5/2009 | Wertz et al. |
| 2009/0134068 A1 | 5/2009 | Falkiner et al. |
| 2009/0178970 A1 | 7/2009 | Stanfel et al. |
| 2009/0249956 A1* | 10/2009 | Chi .................... B01D 39/1623 95/284 |
| 2009/0317621 A1 | 12/2009 | Youngblood et al. |
| 2010/0006494 A1 | 1/2010 | Scher et al. |
| 2010/0050871 A1 | 3/2010 | Moy et al. |
| 2010/0064645 A1 | 3/2010 | Chung et al. |
| 2010/0116138 A1 | 5/2010 | Guimond et al. |
| 2010/0116751 A1 | 5/2010 | Bajpai et al. |
| 2010/0181249 A1* | 7/2010 | Green ................ B01D 39/1623 210/493.1 |
| 2010/0200512 A1 | 8/2010 | Chase et al. |
| 2010/0206800 A1 | 8/2010 | Veit et al. |
| 2010/0285101 A1 | 11/2010 | Moore et al. |
| 2010/0307119 A1 | 12/2010 | Leung et al. |
| 2011/0006017 A1 | 1/2011 | Wieczorek et al. |
| 2011/0067369 A1 | 3/2011 | Chung et al. |
| 2011/0084028 A1 | 4/2011 | Stanfel et al. |
| 2011/0089101 A1 | 4/2011 | Girondi |
| 2011/0124941 A1 | 5/2011 | Verdegan et al. |
| 2011/0138685 A1 | 6/2011 | Kalayci et al. |
| 2011/0147299 A1 | 6/2011 | Stanfel et al. |
| 2011/0147976 A1 | 6/2011 | Wertz et al. |
| 2011/0168622 A1 | 7/2011 | Lucas |
| 2011/0168647 A1 | 7/2011 | Wieczorek et al. |
| 2011/0185903 A1 | 8/2011 | Fox et al. |
| 2011/0198280 A1 | 8/2011 | Jones et al. |
| 2011/0209619 A1 | 9/2011 | Lazarevic et al. |
| 2011/0210061 A1 | 9/2011 | Li et al. |
| 2011/0210081 A1* | 9/2011 | Green .................... B82Y 30/00 210/767 |
| 2011/0215046 A1 | 9/2011 | Rogers et al. |
| 2011/0233152 A1 | 9/2011 | Wieczorek et al. |
| 2011/0238026 A1 | 9/2011 | Zhang et al. |
| 2011/0259796 A1 | 10/2011 | Chen et al. |
| 2011/0259813 A1 | 10/2011 | Wertz et al. |
| 2011/0309012 A1 | 12/2011 | Rogers et al. |
| 2012/0043281 A1 | 2/2012 | Stanfel et al. |
| 2012/0067220 A1 | 3/2012 | Velpari et al. |
| 2012/0067814 A1 | 3/2012 | Guimond et al. |
| 2012/0091072 A1 | 4/2012 | Kozlov et al. |
| 2012/0137885 A1* | 6/2012 | Dullaert ............ B01D 39/1623 96/12 |
| 2012/0152824 A1 | 6/2012 | Cox et al. |
| 2012/0177888 A1 | 7/2012 | Escafere et al. |
| 2012/0204527 A1 | 8/2012 | Chung et al. |
| 2012/0234748 A1 | 9/2012 | Little et al. |
| 2012/0248034 A1 | 10/2012 | Segit et al. |
| 2012/0261330 A1 | 10/2012 | Stanfel et al. |
| 2012/0261358 A1 | 10/2012 | Stanfel et al. |
| 2012/0292252 A1 | 11/2012 | Chase et al. |
| 2012/0312734 A1 | 12/2012 | Kalayci et al. |
| 2012/0312738 A1 | 12/2012 | Rogers et al. |
| 2012/0318754 A1 | 12/2012 | Cox et al. |
| 2013/0001154 A1 | 1/2013 | Chung et al. |
| 2013/0001155 A1 | 1/2013 | Neubauer et al. |
| 2013/0008006 A1 | 1/2013 | Israel et al. |
| 2013/0008846 A1 | 1/2013 | Rogers et al. |
| 2013/0008853 A1 | 1/2013 | Dallas et al. |
| 2013/0029048 A1 | 1/2013 | Goscha et al. |
| 2013/0092622 A1 | 4/2013 | Kas et al. |
| 2013/0118973 A1 | 5/2013 | Seo et al. |
| 2013/0251921 A1 | 9/2013 | Gane et al. |
| 2013/0256230 A1* | 10/2013 | Dullaert ................ B01D 65/08 210/650 |
| 2013/0264276 A1 | 10/2013 | Corn et al. |
| 2013/0276416 A1 | 10/2013 | Schook |
| 2013/0333341 A1 | 12/2013 | Witsch et al. |
| 2013/0340613 A1 | 12/2013 | Krupnikov et al. |
| 2013/0341290 A1 | 12/2013 | Yu et al. |
| 2014/0034580 A1 | 2/2014 | Chen |
| 2014/0044756 A1 | 2/2014 | Woon-Fong et al. |
| 2014/0110354 A1 | 4/2014 | Haberkamp et al. |
| 2014/0116945 A1 | 5/2014 | Kas et al. |
| 2014/0130469 A1 | 5/2014 | Nagy et al. |
| 2014/0275692 A1 | 9/2014 | Patel et al. |
| 2014/0284264 A1 | 9/2014 | Klein et al. |
| 2014/0331626 A1 | 11/2014 | Nagy et al. |
| 2015/0252522 A1 | 9/2015 | Setoguchi et al. |
| 2015/0298070 A1 | 10/2015 | Kozlov et al. |
| 2015/0328565 A1 | 11/2015 | Swaminathan et al. |
| 2016/0002484 A1 | 1/2016 | Geisen et al. |
| 2016/0051919 A1 | 2/2016 | Nagy et al. |
| 2016/0059167 A1 | 3/2016 | Nagy et al. |
| 2016/0136554 A1 | 5/2016 | Swaminathan et al. |
| 2016/0136584 A1 | 5/2016 | Hwang et al. |
| 2016/0166953 A1 | 6/2016 | Swaminathan et al. |
| 2016/0175752 A1 | 6/2016 | Jaganathan et al. |
| 2016/0184751 A1 | 6/2016 | Wertz et al. |
| 2016/0303498 A1 | 10/2016 | Doucouré et al. |
| 2016/0361674 A1 | 12/2016 | Swaminathan et al. |
| 2017/0341006 A1 | 11/2017 | Boesner |
| 2017/0360970 A1 | 12/2017 | Kozlov et al. |
| 2018/0169551 A1 | 6/2018 | Jaganathan et al. |

FOREIGN PATENT DOCUMENTS

| | | |
|---|---|---|
| CN | 2393623 Y | 8/2000 |
| CN | 1150445 C | 5/2004 |
| CN | 1954993 A | 5/2007 |
| CN | 101156998 A | 4/2008 |
| CN | 101967390 A | 2/2011 |
| CN | 102046261 A | 5/2011 |
| CN | 102421583 A | 4/2012 |
| CN | 101098741 B | 10/2012 |
| CN | 103025404 A | 4/2013 |
| DE | 32 15 161 C1 | 12/1983 |
| DE | 102010031842 A1 | 1/2012 |
| DE | 102010031843 A1 | 1/2012 |
| DE | 102012010307 A1 | 11/2013 |
| EP | 0 203 703 A1 | 12/1986 |
| EP | 1 201 286 A1 | 5/2002 |
| EP | 1 254 697 A2 | 11/2002 |
| EP | 1 194 207 B1 | 8/2004 |
| EP | 2816006 A1 | 12/2014 |
| GB | 1 039 551 A | 8/1966 |
| GB | 1 075 575 A | 7/1967 |
| GB | 1 088 029 A | 10/1967 |
| GB | 1 107 607 A | 3/1968 |
| GB | 1 374 290 A | 11/1974 |
| GB | 1 395 399 A | 5/1975 |
| GB | 1 520 495 A | 8/1978 |
| GB | 2 022 433 A | 12/1979 |
| GB | 2 078 536 A | 1/1982 |
| JP | 2009-066534 A | 4/2009 |
| JP | 2016-112520 A | 6/2016 |
| JP | 2017-101346 A | 6/2017 |
| WO | WO 89/03717 A1 | 5/1989 |
| WO | WO 00/37736 A2 | 6/2000 |
| WO | WO 01/056678 A1 | 8/2001 |
| WO | WO 01/73286 A1 | 10/2001 |
| WO | WO 02/076576 A2 | 10/2002 |
| WO | WO 03/057345 A1 | 7/2003 |
| WO | WO 2005/120689 A2 | 12/2005 |
| WO | WO 2006/071979 A1 | 7/2006 |
| WO | WO 2006/101992 A2 | 9/2006 |
| WO | WO 2006/135703 A2 | 12/2006 |
| WO | WO 2007/041559 A2 | 4/2007 |
| WO | WO 2008/058243 A2 | 5/2008 |
| WO | WO 2009/018463 A2 | 2/2009 |
| WO | WO 2009/042641 A2 | 4/2009 |
| WO | WO 2009/095339 A1 | 8/2009 |

(56) References Cited

FOREIGN PATENT DOCUMENTS

| WO | WO 2010/053537 A2 | 5/2010 |
| WO | WO 2011/101750 A1 | 8/2011 |
| WO | WO 2012/069338 A1 | 5/2012 |
| WO | WO 2013/192392 A1 | 12/2013 |
| WO | WO 2014/021167 A1 | 2/2014 |
| WO | WO 2014/060064 A1 | 4/2014 |
| WO | WO 2014/116946 A1 | 7/2014 |
| WO | WO 2014/144687 A1 | 9/2014 |
| WO | WO 2015/036862 A1 | 3/2015 |

OTHER PUBLICATIONS

U.S. Appl. No. 16/108,418, filed Aug. 22, 2018, Nagy et al.

[No Author Listed], Nanofine-Pure Filter Cartridges. TPR Type (Nylon Nanofiber Media). Roki Techno Co., Ltd. Tokyo, Japan. As available Apr. 26, 2016 at <http://www.rokitechno.com/pdf/TPR_E.pdf>. 2 pages.

Guibo et al., The electrospun polyamide 6 nanofiber membranes used as high efficiency filter materials: Filtration potential, thermal treatment, and their continuous production. Journal of Applied Polymer Science. Apr. 2013;128(2):1061-9.

Homeigohar et al., Polyethersulfone electrospun nanofibrous composite membrane for liquid filtration. Journal of Membrane Science. Dec. 2010;365(1-2):68-77.

Huang et al., Increasing strength of electrospun nanofiber membranes for water filtration using solvent vapor. Journal of Membrane Science. Jun. 2013;436:213-20.

U.S. Appl. No. 16/206,566, filed Nov. 30, 2018, Rezaei et al.

\* cited by examiner

STABLE FILTER MEDIA INCLUDING NANOFIBERS

FIELD OF INVENTION

The present embodiments relate generally to filter media and, specifically, to filter media comprising nanofibers which may be used in a variety of applications (e.g., sterilizing grade filters).

BACKGROUND

Filter elements can be used to remove contamination in a variety of applications. Such elements can include a filter media which may be formed of a web of fibers. The fiber web provides a porous structure that permits fluid (e.g., gas, liquid) to flow through the media. Contaminant particles (e.g., microorganism particles, virus particles, biological cells, debris from biological cells, and bimolecular aggregates) contained within the fluid may be trapped on or in the fiber web. Depending on the application, the filter media may be designed to have different performance characteristics such as enhanced particulate efficiency.

Some filtration applications require the filter media to meet certain efficiency standards. For example, a sterilizing grade filter rated at 0.22 microns or less is required to meet efficiency standards specified in ASTM F838-05. In some existing filter media, the requisite efficiency is achieved at the expense of other beneficial properties of the filter media, such as permeability and structural stability under various conditions. For instance, some conventional filter media utilize polymer membranes to achieve the requisite particulate efficiency and stability under a variety of conditions. However, suitable polymer membranes that are stable under a variety of conditions often have a relatively low porosity and/or high resistance, due, at least in part, to a restricted network of open interconnected pores. As another example, many existing filter media use efficiency fiber webs comprising relatively small diameter fibers, which impart high particulate efficiency, but may exhibit a significant loss in filtration performance after a sterilization process (e.g., steam sterilizations). For instance, the structural integrity of some conventional nanofibrous media may be irreversibly compromised when exposed to pressures greater than 30 psi, resulting in a drastic decrease in particulate efficiency and inconsistent permeability, thus compromising the reliability of these conventional nanofibrous media as submicron filters. Moreover, some nanofibrous media have a limited depth loading capacity.

In some such conventional membranous and fibrous filter media, a tradeoff may exist between high particulate efficiency, permeability, stability, and/or long service life. Accordingly, there is a need for filter media that can achieve the requisite particulate efficiency, high permeability, and structural stability under various conditions (e.g., high temperature, high pressure, steam sterilization).

SUMMARY OF THE INVENTION

Filter media comprising nanofibers and related components, systems, and methods associated therewith are provided. The subject matter of this application involves, in some cases, interrelated products, alternative solutions to a particular problem, and/or a plurality of different uses of structures and compositions.

In one set of embodiments, filter media are provided.

In one embodiment, a filter media comprises a first fiber web having an average fiber diameter of less than or equal to about 0.5 microns and a maximum pore size of less than or equal to about 1.0 micron. The filter media further comprises a second fiber web having a maximum pore size of greater than or equal to about 3 microns and less than or equal to about 70 microns. A critical wetting surface tension of the first fiber web and a critical wetting surface tension of the second fiber web differ by less than or equal to about 15 dynes/cm.

In another embodiment, a filter media comprises a first fiber web having an average fiber diameter of less than or equal to about 0.5 microns and a maximum pore size of less than or equal to about 1.0 micron. The filter media further comprises a second fiber web having a maximum pore size of greater than or equal to about 3 microns and less than or equal to about 70 microns. The first and second fiber webs are directly adjacent and have a peel strength of greater than or equal to about 0.01 lb/in and less than or equal to about 10 lb/in.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
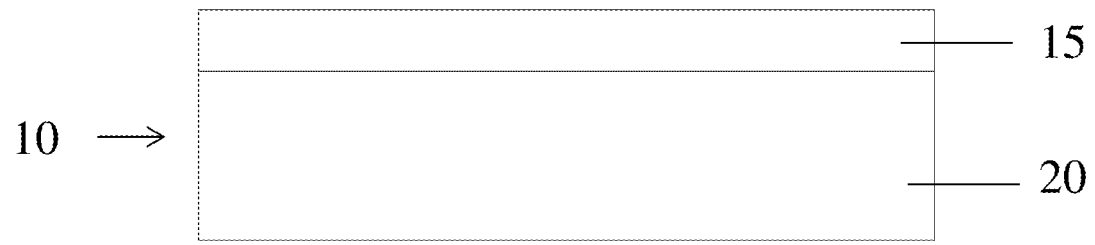
FIGS. 1A-1C show cross-sections of filter media according to certain embodiments.

Filter media comprising nanofibers and related components, systems, and methods associated therewith are provided. In some embodiments, a filter media may comprise a first fiber web (e.g., nanofiber fiber web) and a second fiber web (e.g., support fiber web) designed to impart beneficial properties to the filter media. For instance, in some embodiments, the first fiber web may provide high particulate efficiency and the second fiber web may provide suitable dirt holding capacity and/or mechanical stability. In some embodiments, the first and second fiber webs may have certain properties (e.g., water contact angle, surface energy) that are similar or substantially the same. The similarities between the first and second fiber webs may serve to enhance the structural stability of the filter media under various conditions (e.g., high temperature, high pressure, steam sterilization) and/or permeability to certain fluids (e.g., water). Filter media, as described herein, may be particularly well-suited for applications that involve liquid filtration, including microfiltration and ultrafiltration in sterile environments, though the media may also be used in other applications, such as microfiltration and ultrafiltration for the oil and gas, process water, wastewater, semiconductor, desalination and chemical industries.

In some embodiments, the filter media, described herein, do not suffer from one or more limitations of conventional filter media. For instance, the filter media, described herein, may be able to achieve the requisite particulate efficiency while having a high permeability and being structurally stable under various conditions (e.g., high temperature, high pressure, steam sterilization). In one example, the filter media may include a first fiber web that comprises nanofibers (e.g., having an average diameter of less than or equal to about 0.5 microns) and a second fiber web. The first fiber web may be configured to retain a relatively high percentage of particles (e.g., microorganisms, virus particles, biological cells) while maintaining a relatively high permeability. For example, the first fiber web may have a maximum pore size of less than or equal to about 0.5 microns (e.g., pre- and post-sterilization), a porosity between about 70% and about 90%, and/or surface area between about 5 $m^2/g$ to about 350 $m^2/g$ (e.g., between about 5 $m^2/g$ to about 70 $m^2/g$). The second fiber web may be configured to impart beneficial properties (e.g., mechanical support, dirt holding capacity) to the filter media while having relatively minimal or no adverse effects on one or more properties of the filter media that are important for a given application, such as permeability, structural stability, and/or particulate efficiency. In some such embodiments, the second fiber web may have a maximum pore size of between about 1 micron and about 70 microns (e.g., between about 3 microns and about 30 microns) and/or the ratio of the average diameter of fibers in the second fiber web to the average diameter of fibers in the first fiber web between about 1 and about 100 (e.g., between about 1 and about 70).

As noted above, in some embodiments, the similarity between the first and second fiber webs may serve to enhance the structural stability of the filter media under various conditions and/or permeability to certain fluids. For instance, as described in more detail below, a filter media comprising first and second fiber webs having substantially the same or similar water contact angle, critical surface tension, and/or critical wetting surface tension may exhibit enhanced wetting characteristics (e.g., fluid absorption and permeability), mechanical integrity (e.g., peel strength), and/or structural stability under various conditions compared to a filter media comprising first and second fiber webs that are dissimilar with respect to these properties. In some such embodiments, the first and second fiber webs may differ in water contact angle by less than or equal to about 20° (e.g., less than or equal to about 15°), in critical surface tension by less than or equal to about 15 dynes/cm (e.g., less than or equal to about 7 dynes/cm) and/or differ in critical wetting surface tension by less than or equal to about 15 dynes/cm (e.g., less than or equal to about 5 dynes/cm).

The combination of structural features and similarity of certain properties of the first and second fiber webs may produce a filter media having improved and unexpected filtration performance. For instance, the filter media may have a water permeability of greater than or equal to about 0.1 ml/min·$cm^2$·psi, a peel strength between the first and second fiber webs of between about 0.01 lb/in and about 10 lb/in, and the maximum pore size may change by less than or equal to about 20% when exposed to various conditions (e.g., steam sterilization, high pressures, high temperatures). Filter media comprising a first and a second fiber web, as described herein, may be used to meet certain particulate efficiency standards (e.g., ASTM F838-05) while also having a desirable water permeability, peel strength, stability, dirt holding capacity, and/or service life, amongst other beneficial properties.

Figure 1B:
Figure 1C:

Non-limiting examples of filter media comprising a fiber webs are shown in FIGS. 1A-1C. In some embodiments, a filter media 10 may include a first fiber web 15 and a second fiber web 20. In some embodiments, the first fiber web 15 and the second fiber web 20 may be directly adjacent as shown in FIGS. 1A-B. In some such embodiments, the first and second fiber webs may be laminated or otherwise adhered together. Without being bound by theory, it is believed that the similarity between the first and second fiber webs serves to enhance the adhesion between the fiber webs. In other embodiments, fiber webs 15 and 20 may not be directly adjacent to one another, and one or more intervening fiber webs (e.g., scrim) may separate the fiber webs.

As used herein, when a fiber web is referred to as being "adjacent" another fiber web, it can be directly adjacent the fiber web, or an intervening fiber web also may be present. A fiber web that is "directly adjacent" another fiber web means that no intervening fiber web is present.

In some embodiments, filter media 10 may comprise one or more optional fiber webs (e.g., scrim, fiber web) positioned upstream and/or downstream of fiber webs 15 and/or 20 as illustrated in FIGS. 1B-1C. For instance, as illustrated in FIG. 1B, in some embodiments, the filter media may comprise an optional fiber web 25 upstream of the first fiber web and the second fiber web. In some instances, the optional fiber web 25 may be directly adjacent to the first fiber web. In certain embodiments, fiber web 25 may have an average fiber diameter greater than the average fiber diameter of the first and second fiber webs and, in some embodiments, may be directly adjacent to the first fiber web. In some instances, fiber web 25 may have an average fiber diameter less than the average fiber diameter of the second fiber web and may be directly adjacent to the first fiber web. In certain embodiments, fiber web 25 may be a scrim that is directly adjacent to the first fiber web. In other embodiments, fiber webs 15 and 25 may be indirectly adjacent to one another, and one or more intervening fiber webs may separate the fiber webs.

Regardless of whether the filter media comprises optional fiber web 25, the filter media 10 may comprise an optional fiber web 30 downstream of the second fiber web as shown in FIG. 1C. In some instances, the fiber web 30 may be directly adjacent to the second fiber web. In certain embodiments, fiber web 30 may have an average fiber diameter less than the average fiber diameter of the second fiber web and, in some embodiments, may be directly adjacent to the second fiber web. In other embodiments, fiber webs 15 and 30 may be indirectly adjacent to one another, and one or more intervening fiber webs may separate the fiber webs.

In general, the one or more optional fiber webs may be any suitable fiber web (e.g., a scrim fiber web, a backer fiber web, a substrate fiber web, an efficiency fiber web, a capacity fiber web, a spacer fiber web, a support fiber web).

In some embodiments, one or more fiber web in the filter media may be designed to be discrete from another fiber web. That is, the fibers from one fiber web do not substantially intermingle (e.g., do not intermingle at all) with fibers from another fiber web. For example, with respect to FIG. 1, in one set of embodiments, fibers from the first fiber web do not substantially intermingle with fibers of the second fiber web. Discrete fiber webs may be joined by any suitable process including, for example, lamination, thermo-dot bonding, calendering, through-gas bonding, ultrasonic processes, chemical bonding process (e.g., to form covalent bonds), or by adhesives, as described in more detail below. It should be appreciated, however, that certain embodiments may include one or more fiber webs that are not discrete with respect to one another.

It should be understood that the configurations of the fiber webs shown in the figures are by way of example only, and that in other embodiments, filter media including other configurations of fiber webs may be possible. For example, while the first, second, and optional fiber webs are shown in a specific order in FIG. 1, other configurations are also possible. For example, an optional fiber web may be positioned between the first and second fiber webs. It should be appreciated that the terms "first", and "second" fiber webs, as used herein, refer to different fiber webs within the media, and are not meant to be limiting with respect to the location of that fiber web. Furthermore, in some embodiments, additional fiber webs (e.g., "third", "fourth", "fifth", "sixth", or "seventh" fiber webs) may be present in addition to the ones shown in the figures. It should also be appreciated that not all fiber webs shown in the figures need be present in some embodiments.

The structural features of first fiber web 15 may be balanced to produce a first fiber web that imparts beneficial properties to the filter media while having certain properties that are similar or substantially the same as the second fiber web. In some embodiments, the first fiber web has a relatively small average fiber diameter that imparts a relatively high particulate efficiency, and/or surface area while having a relatively low maximum pore size, relatively high permeability, low basis weight, and/or low solidity.

In some embodiments, the maximum pore size of the first fiber web may be relatively small. For instance, in some embodiments, the first fiber web may have a maximum pore size of less than or equal to about 1 micron, less than or equal to about 0.8 microns, less than or equal to about 0.5 microns, less than or equal to about 0.4 microns, less than or equal to about 0.3 microns, less than or equal to about 0.2 microns, less than or equal to about 0.1 microns, less than or equal to about 0.09 microns, less than or equal to about 0.08 microns, less than or equal to about 0.07 microns, or less than or equal to about 0.6 microns.

In some instances, the first fiber web may have a maximum pore size of greater than or equal to about 0.05 microns, greater than or equal to about 0.06 microns, greater than or equal to about 0.07 microns, greater than or equal to about 0.08 microns, greater than or equal to about 0.09 microns, greater than or equal to about 0.1 microns, greater than or equal to about 0.2 microns, greater than or equal to about 0.3 microns, or greater than or equal to about 0.4 microns.

Combinations of the above-referenced ranges are also possible (e.g., greater than or equal to about 0.05 microns and less than or equal to about 1 micron, greater than or equal to about 0.1 microns and less than or equal to about 0.8 microns). Other values of maximum pore size are also possible. The maximum pore size may be determined via bubble point measurement according to the standard ASTM F-316-80 Method B, BS6410, e.g., using a Capillary Flow Porometer (e.g., model number CFP-34RTF-8A-X6) made by Porous Materials Inc. and Galwick, which has a fluid surface tension of 15.9 dynes/cm.

In some embodiments, the first fiber web may have an average fiber diameter of less than or equal to about 0.5 microns, less than or equal to about 0.4 microns, less than or equal to about 0.3 microns, less than or equal to about 0.2 microns, less than or equal to about 0.1 microns, less than or equal to about 0.08 microns, less than or equal to about 0.06 microns, less than or equal to about 0.05 microns, less than or equal to about 0.04 microns, less than or equal to about 0.03 microns, or less than or equal to about 0.02 microns.

In some instances, the average fiber diameter of the first fiber web may be greater than or equal to about 0.01 microns, greater than or equal to about 0.02 microns, greater than or equal to about 0.03 microns, greater than or equal to about 0.04 microns, greater than or equal to about 0.05 microns, greater than or equal to about 0.06 microns, greater than or equal to about 0.08 microns, greater than or equal to about 0.1 microns, greater than or equal to about 0.2 microns, greater than or equal to about 0.3 microns, or greater than or equal to about 0.4 microns.

Combinations of the above-referenced ranges are also possible (e.g., greater than or equal to about 0.01 microns and less than or equal to about 0.5 microns, greater than or equal to about 0.05 microns and less than or equal to about 0.5 microns). Other values of average fiber diameter are also possible.

As noted above, the filter media may comprise a first fiber web and a second fiber web that have similar or substantially the same wettability with respect to a particular fluid. The wettability may be determined using water contact angle, critical surface tension, and/or critical wetting surface tension. In some instances, more than one type of measurement of wettability is needed to fully characterize the wettability of a fiber web.

The water contact angle may be measured using standard ASTM D5946 (2009). The contact angle is the angle between the fiber web surface and the tangent line drawn to the water droplet surface at the three-phase point (solid, liquid, and gas phase point), when a liquid drop is resting on the substrate surface. A contact angle meter or goniometer can be used for this determination.

In some embodiments, the first and second fiber webs may differ in water contact angle by less than or equal to about 20°, less than or equal to about 18°, less than or equal to about 15°, less than or equal to about 12°, less than or equal to about 10°, less than or equal to about 8°, less than or equal to about 5°, less than or equal to about 3°, or less than or equal to about 1° and greater than or equal to about 0°. In some embodiments, the water contact angles may be substantially the same. In certain embodiments, the difference in water contact angles may be greater than about 0°.

In some embodiments, the water contact angle on the first fiber web and/or second fiber web may be greater than or equal to about 5 degrees, greater than or equal to about 10 degrees, greater than or equal to about 15 degrees, greater than or equal to about 20 degrees, greater than or equal to about 25 degrees, greater than or equal to about 30 degrees, greater than or equal to about 35 degrees, greater than 40 degrees, greater than or equal to 45 degrees, greater than or equal to 50 degrees, greater than or equal to 55 degrees, greater than or equal to 60 degrees, greater than or equal to 65 degrees, greater than or equal to 70 degrees, greater than or equal to 75 degrees, greater than or equal to 80 degrees, greater than or equal to 85 degrees, greater than or equal to 90 degrees, greater than or equal to 95 degrees, greater than or equal to 100 degrees, greater than or equal to 110 degrees, or greater than or equal to 120 degrees.

In some instances, the water contact angle on the first and/or second fiber web is less than or equal to about 150 degrees, less than or equal to about 140 degrees, less than or equal to about 130 degrees, less than or equal to about 120 degrees, less than or equal to about 110 degrees, less than or equal to about 105 degrees, less than or equal to about 100 degrees, less than or equal to about 95 degrees, less than or equal to about 90 degrees, less than or equal to about 85 degrees, less than or equal to about 80 degrees, less than or equal to about 75 degrees, less than or equal to about 70 degrees, less than or equal to about 65 degrees, less than or equal to about 60 degrees, less than or equal to about 55 degrees, less than or equal to about 50 degrees, less than or equal to about 45 degrees, less than or equal to about 40 degrees, less than or equal to about 35 degrees, less than or equal to about 30 degrees, less than or equal to about 25 degrees, or less than or equal to about 20 degrees.

Combinations of the above-referenced ranges are also possible (e.g., greater than or equal to about 5 degrees and less than or equal to about 150 degrees, greater than or equal to about 20 degrees and less than or equal to about 100 degrees).

The critical surface tension may be determined using the wetting tension method, per ASTM D-2578, at ambient temperature (e.g., 21° C.). In some embodiments, the first and second fiber webs may differ in critical surface tension by less than or equal to about 15 dynes/cm, less than or equal to about 12 dynes/cm, less than or equal to about 10 dynes/cm, less than or equal to about 7 dynes/cm, less than or equal to about 5 dynes/cm, less than or equal to about 3 dynes/cm, or less than or equal to about 1 dynes/cm and greater than or equal to about 0 dynes/cm. In some embodiments, the critical surface tension may be substantially the same. In certain embodiments, the difference in the critical surface tensions may be greater than about 0 dynes/cm.

In some embodiments, the critical surface tension on the first fiber web and/or second fiber web may be greater than or equal to about 18 dynes/cm, greater than or equal to about 25 dynes/cm, greater than or equal to about 50 dynes/cm, greater than or equal to about 75 dynes/cm, greater than or equal to about 100 dynes/cm, greater than or equal to about 150 dynes/cm, greater than or equal to about 200 dynes/cm, greater than or equal to about 250 dynes/cm, greater than or equal to about 300 dynes/cm, or greater than or equal to about 350 dynes/cm.

In some instances, the first fiber web and/or second fiber web may have a critical surface tension of less than or equal to about 400 dynes/cm, less than or equal to about 375 dynes/cm, less than or equal to about 350 dynes/cm, less than or equal to about 325 dynes/cm, less than or equal to about 300 dynes/cm, less than or equal to about 250 dynes/cm, less than or equal to about 200 dynes/cm, less than or equal to about 150 dynes/cm, less than or equal to about 100 dynes/cm, or less than or equal to about 50 dynes/cm.

Combinations of the above-referenced ranges are possible (e.g., greater than or equal to about 18 dynes/cm and less than or equal to about 400 dynes/cm, greater than or equal to about 25 dynes/cm and less than or equal to about 400 dynes/cm). Other values of the critical surface tension are possible.

As used herein, the critical wetting surface tension of a fiber web is defined as the mean of the surface tension of the last liquid in a series that is absorbed by the fiber web and the surface tension of the first liquid in a series that is not absorbed by the fiber web using the test described below. The critical wetting surface tension of a fiber web may be determined by applying a series of liquids in a sequential manner (i.e., from lowest surface tension to highest surface tension) to the surface of the fiber web and observing the absorption or non-absorption of each liquid as described in U.S. Pat. No. 4,880,548, which is incorporated by reference in its entirety. The techniques involves placing ten drops of a first liquid and 10 drops of a second liquid onto representative portions of the fiber web and allowing the drops to stand for 10 minutes. The diameter of the droplets is between 3 mm and 5 mm. The two liquids should be selected so that the difference in surface tension between them is about 2 dynes/cm. Absorption is defined as the wetting of a fiber web on its top and bottom surface by at least nine of the ten drops within 10 minutes. Non-absorption is defined when at least nine of the ten drops will not fully penetrate through the porous media, i.e., the bottom surface remains dry. Testing is continued using liquids of successively higher or lower surface tension, until a pair has been identified, one absorbing and one non-absorbing, which are the most closely spaced in surface tension. The critical wetting surface tension is then within that range and the average of the two surface tensions is used as a single number to specify the critical wetting surface tension.

In some embodiments, the first and second fiber webs may differ in critical wetting surface tension by less than or equal to about 15 dynes/cm, less than or equal to about 12 dynes/cm, less than or equal to about 10 dynes/cm, less than or equal to about 8 dynes/cm, less than or equal to about 5 dynes/cm, less than or equal to about 3 dynes/cm, or less than or equal to about 1 dynes/cm and greater than or equal to about 0 dynes/cm. In some embodiments, the critical wetting surface tensions may be substantially the same. In certain embodiments, the difference in critical wetting surface tension may be greater than about 0 dynes/cm.

In some embodiments, the critical wetting surface tension on the first fiber web and/or second fiber web may be greater than or equal to about 10 dynes/cm, greater than or equal to about 15 dynes/cm, greater than or equal to about 25 dynes/cm, greater than or equal to about 30 dynes/cm, greater than or equal to about 40 dynes/cm, greater than or equal to about 50 dynes/cm, greater than or equal to about 60 dynes/cm, greater than or equal to about 70 dynes/cm, greater than or equal to about 80 dynes/cm, or greater than or equal to about 90 dynes/cm.

In some instances, the first fiber web and/or second fiber web may have a critical wetting surface tension of less than or equal to about 110 dynes/cm, less than or equal to about 100 dynes/cm, less than or equal to about 90 dynes/cm, less than or equal to about 80 dynes/cm, less than or equal to about 72 dynes/cm, less than or equal to about 60 dynes/cm, less than or equal to about 50 dynes/cm, less than or equal to about 40 dynes/cm, less than or equal to about 30 dynes/cm, or less than or equal to about 20 dynes/cm.

Combinations of the above-referenced ranges are possible (e.g., greater than or equal to about 10 dynes/cm and less than or equal to about 110 dynes/cm, greater than or equal to about 25 dynes/cm and less than or equal to about 72 dynes/cm). Other values of the critical wetting surface tension are possible.

In some embodiments, the first fiber web may have a relatively low basis weight. For instance, in some embodiments, the basis weight of the first fiber web may be less than or equal to about 25% (e.g., less than or equal to about 20%, less than or equal to about 15%, less than or equal to about 10%) of the basis weight of the filter media (e.g., combined basis weight of the first and second fiber webs) and/or the second fiber web. In some embodiments, the first fiber web may have a basis weight of less than or equal to about 10 g/m$^2$, less than or equal to about 9 g/m$^2$, less than or equal to about 8 g/m$^2$, less than or equal to about 7 g/m$^2$, less than or equal to about 6 g/m$^2$, less than or equal to about 5 g/m$^2$, less than or equal to about 4 g/m², less than or equal to about 3 g/m², less than or equal to about 2 g/m², or less than or equal to about 1 g/m².

In some instances, the first fiber web may have a basis weight of greater than or equal to about 0.5 g/m², greater than or equal to about 1 g/m², greater than or equal to about 2 g/m², greater than or equal to about 3 g/m², greater than or equal to about 4 g/m², greater than or equal to about 5 g/m², greater than or equal to about 6 g/m², greater than or equal to about 7 g/m², or greater than or equal to about 8 g/m².

Combinations of the above-referenced ranges are possible (e.g., greater than or equal to about 0.5 g/m² and less than or equal to about 10 g/m², greater than or equal to about 1 g/m² and less than or equal to about 5 g/m²). Other values of basis weight are possible. The basis weight may be determined according to the standard ISO 536 (2012).

As described in more detail below, the first fiber web may comprise synthetic fibers, amongst other fiber types. In some instances, the first fiber web may comprise a relatively high weight percentage of synthetic fibers (e.g., greater than or equal to about 95 wt. %, 100 wt. %). In some instances, the synthetic fibers may be continuous as described further below. For example, the fiber web may comprise a relatively high percentage (e.g., greater than or equal to about 95 wt. %, 100 wt. %) of synthetic fibers formed via an electrospinning process. In general, the first fiber web may comprise synthetic fibers formed by any suitable process including an electrospinning process, meltblown process, melt spinning process, or centrifugal spinning process.

In some embodiments, the first fiber web may be relatively thin. For instance, in some embodiments, the first fiber web may have a thickness of less than or equal to about 6 mil, less than or equal to about 5 mil, less than or equal to about 4.5 mil, less than or equal to about 4 mil, less than or equal to about 3.5 mil, less than or equal to about 3 mil, less than or equal to about 2.5 mil, less than or equal to about 2 mil, less than or equal to about 1.5 mil, less than or equal to about 1 mil, less than or equal to about 0.9 mil, less than or equal to about 0.8 mil, less than or equal to about 0.7 mil, less than or equal to about 0.6 mil, less than or equal to about 0.5 mil, or less than or equal to about 0.4 mil.

In some instances, the first fiber web may have a thickness of greater than or equal to about 0.15 mil, greater than or equal to about 0.2 mil, greater than or equal to about 0.3 mil, greater than or equal to about 0.4 mil, greater than or equal to about 0.5 mil, greater than or equal to about 0.6 mil, greater than or equal to about 0.7 mil, greater than or equal to about 0.8 mil, greater than or equal to about 0.9 mil, greater than or equal to about 1 mil, greater than or equal to about 1.5 mil, greater than or equal to about 2 mil, greater than or equal to about 2.5 mil, greater than or equal to about 3 mil, greater than or equal to about 3.5 mil, or greater than or equal to about 4 mil.

Combinations of the above-referenced ranges are also possible (e.g., greater than or equal to about 0.2 mil and less than or equal to about 6 mil, greater than or equal to about 0.4 mil and less than or equal to about 5 mil, greater than or equal to about 0.6 mil and less than or equal to about 5 mil). Other values of average thickness are also possible. The thickness is determined according to the standard ASTM D1777.

In certain embodiments, the first fiber web, described herein, may have a relatively high surface area. For instance, in some embodiments, the first fiber web may have a surface area of greater than or equal to about 5 m²/g, greater than or equal to about 10 m²/g, greater than or equal to about 25 m²/g, greater than or equal to about 50 m²/g, greater than or equal to about 75 m²/g, greater than or equal to about 100 m²/g, greater than or equal to about 125 m²/g, greater than or equal to about 150 m²/g, greater than or equal to about 175 m²/g, greater than or equal to about 200 m²/g, greater than or equal to about 225 m²/g, greater than or equal to about 250 m²/g, greater than or equal to about 275 m²/g, or greater than or equal to about 300 m²/g.

In some instances, the first fiber web may have a surface area of less than or equal to about 350 m²/g, less than or equal to about 325 m²/g, less than or equal to about 300 m²/g, less than or equal to about 275 m²/g, less than or equal to about 250 m²/g, less than or equal to about 225 m²/g, less than or equal to about 200 m²/g, less than or equal to about 175 m²/g, less than or equal to about 150 m²/g, less than or equal to about 125 m²/g, less than or equal to about 100 m²/g, less than or equal to about 70 m²/g, less than or equal to about 40 m²/g, or less than or equal to about 10 m²/g.

It should be understood that combinations of the above-reference ranges are possible (e.g., greater than or equal to about 5 m²/g and less than or equal to about 350 m²/g, greater than or equal to about 5 m²/g and less than or equal to about 70 m²/g).

As determined herein, surface area is measured through use of a standard BET surface area measurement technique. The BET surface area is measured according to section 10 of Battery Council International Standard BCIS-03A, "Recommended Battery Materials Specifications Valve Regulated Recombinant Batteries", section 10 being "Standard Test Method for Surface Area of Recombinant Battery Separator Mat". Following this technique, the BET surface area is measured via adsorption analysis using a BET surface analyzer (e.g., Micromeritics Gemini III 2375 Surface Area Analyzer) with nitrogen gas; the sample amount is between 0.5 and 0.6 grams in, e.g., a ¾" tube; and, the sample is allowed to degas at 75 degrees C. for a minimum of 3 hours.

In certain embodiments, the first fiber web, described herein, may have a relatively low solidity. For instance, in some embodiments, the first fiber web may have a solidity of less than or equal to about 30%, less than or equal to about 28%, less than or equal to about 25%, less than or equal to about 22%, less than or equal to about 20%, less than or equal to about 18%, less than or equal to about 15%, or less than or equal to about 12%.

In some instances, the first fiber web may have a solidity of greater than or equal to about 10%, greater than or equal to about 12%, greater than or equal to about 15%, greater than or equal to about 18%, greater than or equal to about 20%, greater than or equal to about 22%, greater than or equal to about 25%, or greater than or equal to about 28%.

It should be understood that combinations of the above-reference ranges are possible (e.g., greater than or equal to about 10% and less than or equal to about 30%). Solidity, as used herein, may be determined by using the following formula: solidity (%)=[basis weight/(fiber density*thickness)]*100. The basis weight and thickness may be determined as described herein. The porosity can be derived from the solidity based on the following equation solidity (%)=100−porosity (%).

In some embodiments, the porosity of the first fiber web may be greater than or equal to about 70%, greater than or equal to about 72%, greater than or equal to about 75%, greater than or equal to about 78%, greater than or equal to about 80%, greater than or equal to about 82%, greater than or equal to about 85%, or greater than or equal to about 88%. In some instances, the porosity of the first fiber web may be less than or equal to about 90%, less than or equal to about 88%, less than or equal to about 85%, less than or equal to about 82%, less than or equal to about 80%, less than or equal to about 78%, less than or equal to about 75%, or less than or equal to about 72%. It should be understood that combinations of the above-reference ranges are possible (e.g., greater than or equal to about 70% and less than or equal to about 90%).

In some embodiments, filter media 10 may comprise a second fiber web 20. The second fiber web may be configured to impart beneficial properties (e.g., mechanical support, high dirt holding capacity) to the filter media while having relatively minimal or no adverse effects on one or more properties of the filter media that are important for a given application, such as permeability, structural stability, and/or particulate efficiency.

In some embodiments, the second fiber web 20 may have a maximum pore size of less than or equal to about 70 micron, less than or equal to about 60 microns, less than or equal to about 50 microns, less than or equal to about 40 microns, less than or equal to about 30 microns, less than or equal to about 20 microns, less than or equal to about 10 microns, less than or equal to about 8 microns, less than or equal to about 5 microns, or less than or equal to about 2 microns.

In some instances, the second fiber web may have a maximum pore size of greater than or equal to about 1 micron, greater than or equal to about 3 microns, greater than or equal to about 5 microns, greater than or equal to about 10 microns, greater than or equal to about 20 microns, greater than or equal to about 30 microns, greater than or equal to about 40 microns, greater than or equal to about 50 microns, or greater than or equal to about 60 microns.

Combinations of the above-referenced ranges are also possible (e.g., greater than or equal to about 1 micron and less than or equal to about 70 micron, greater than or equal to about 3 microns and less than or equal to about 30 microns). Other values of maximum pore size are also possible.

In some embodiments, the second fiber web may have a solidity of less than or equal to about 50%, less than or equal to about 45%, less than or equal to about 40%, less than or equal to about 35%, less than or equal to about 30%, less than or equal to about 25%, less than or equal to about 20%, less than or equal to about 15%, or less than or equal to about 12%. In some instances, the second fiber web may have a solidity of greater than or equal to about 10%, greater than or equal to about 15%, greater than or equal to about 20%, greater than or equal to about 25%, greater than or equal to about 30%, greater than or equal to about 35%, greater than or equal to about 40%, or greater than or equal to about 45%. It should be understood that combinations of the above-reference ranges are possible (e.g., greater than or equal to about 10% and less than or equal to about 50%, greater than or equal to about 10% and less than or equal to about 30%).

In some embodiments, the porosity of the second fiber web may be greater than or equal to about 50%, greater than or equal to about 55%, greater than or equal to about 60%, greater than or equal to about 65%, greater than or equal to about 70%, greater than or equal to about 75%, greater than or equal to about 80%, or greater than or equal to about 85%. In some instances, the porosity of the second fiber web may be less than or equal to about 90%, less than or equal to about 85%, less than or equal to about 80%, less than or equal to about 75%, less than or equal to about 70%, less than or equal to about 65%, less than or equal to about 60%, or less than or equal to about 55%.

It should be understood that combinations of the above-reference ranges are possible (e.g., greater than or equal to about 50% and less than or equal to about 90%, greater than or equal to about 70% and less than or equal to about 90%).

In some embodiments, the second fiber web may have an average fiber diameter of less than or equal to about 20 microns, less than or equal to about 18 microns, less than or equal to about 15 microns, less than or equal to about 12 microns, less than or equal to about 10 microns, less than or equal to about 8 microns, less than or equal to about 5 microns, less than or equal to about 3 microns, less than or equal to about 1 micron, or less than or equal to about 0.8 microns.

In some instances, the average fiber diameter may be greater than or equal to about 0.5 microns, greater than or equal to about 0.8 microns, greater than or equal to about 1 micron, greater than or equal to about 3 microns, greater than or equal to about 5 micron, greater than or equal to about 8 microns, greater than or equal to about 10 microns, greater than or equal to about 12 microns, greater than or equal to about 15 microns, or greater than or equal to about 18 microns.

Combinations of the above-referenced ranges are also possible (e.g., greater than or equal to about 0.5 microns and less than or equal to about 20 microns, greater than or equal to about 0.5 microns and less than or equal to about 10 microns). Other values of average fiber diameter are also possible.

As described in more detail below, the second fiber web may comprise synthetic fibers, amongst other fiber types. In some instances, the second fiber web may comprise a relatively high weight percentage of synthetic fibers (e.g., greater than or equal to about 95 wt. %, 100 wt. %).

In some embodiments, the second fiber web may have a basis weight of less than or equal to about 70 g/m$^2$, less than or equal to about 65 g/m$^2$, less than or equal to about 60 g/m$^2$, less than or equal to about 55 g/m$^2$, less than or equal to about 50 g/m$^2$, less than or equal to about 45 g/m$^2$, less than or equal to about 40 g/m$^2$, less than or equal to about 35 g/m$^2$, less than or equal to about 30 g/m$^2$, less than or equal to about 25 g/m$^2$, less than or equal to about 20 g/m$^2$, less than or equal to about 15 g/m$^2$, less than or equal to about 10 g/m$^2$, or less than or equal to about 8 g/m$^2$.

In some instances, the second fiber web may have a basis weight of greater than or equal to about 5 g/m$^2$, greater than or equal to about 10 g/m$^2$, greater than or equal to about 15 g/m$^2$, greater than or equal to about 20 g/m$^2$, greater than or equal to about 25 g/m$^2$, greater than or equal to about 30 g/m$^2$, greater than or equal to about 45 g/m$^2$, greater than or equal to about 50 g/m$^2$, greater than or equal to about 55 g/m$^2$, greater than or equal to about 60 g/m$^2$, or greater than or equal to about 65 g/m$^2$.

Combinations of the above-referenced ranges are also possible (e.g., greater than or equal to about 5 g/m$^2$ and less than or equal to about 40 g/m$^2$, greater than or equal to about 10 g/m$^2$ and less than or equal to about 40 g/m$^2$). Other values of basis weight are also possible.

In some embodiments, the second fiber web may have a thickness of less than or equal to about 25 mil, less than or equal to about 22 mil, less than or equal to about 20 mil, less than or equal to about 18 mil, less than or equal to about 15 mil, less than or equal to about 12 mil, less than or equal to about 10 mil, less than or equal to about 8 mil, less than or equal to about 5 mil, or less than or equal to about 3 mil.

In some instances, the second fiber web may have a thickness of greater than or equal to about 1 mil, greater than or equal to about 3 mil, greater than or equal to about 5 mil, greater than or equal to about 8 mil, greater than or equal to about 10 mil, greater than or equal to about 12 mil, greater than or equal to about 15 mil, greater than or equal to about 18 mil, or greater than or equal to about 20 mil.

Combinations of the above-referenced ranges are also possible (e.g., greater than or equal to about 1 mil and less than or equal to about 25 mil, greater than or equal to about 3 mil and less than or equal to about 15 mil). Other values of average thickness are also possible.

In some embodiments, the average fiber diameter of the second fiber web may be substantially the same as or greater than the average fiber diameter of the first fiber web. For instance, in some embodiments, the ratio of the average diameter of fibers in the second fiber web to the average diameter of fibers in the first fiber web is greater than or equal to about 1, greater than or equal to about 5, greater than or equal to about 10, greater than or equal to about 15, greater than or equal to about 20, greater than or equal to about 25, greater than or equal to about 30, greater than or equal to about 35, greater than or equal to about 40, greater than or equal to about 45, greater than or equal to about 50, greater than or equal to about 55, greater than or equal to about 60, greater than or equal to about 65, greater than or equal to about 70, greater than or equal to about 75, greater than or equal to about 80, greater than or equal to about 85, or greater than or equal to about 90.

In some instances, the ratio of the average diameter of fibers in the second fiber web to the average diameter of fibers in the first fiber web is less than or equal to about 100, less than or equal to about 95, less than or equal to about 90, less than or equal to about 85, less than or equal to about 80, less than or equal to about 75, less than or equal to about 70, less than or equal to about 65, less than or equal to about 60, less than or equal to about 55, less than or equal to about 50, less than or equal to about 45, less than or equal to about 40, less than or equal to about 35, less than or equal to about 30, less than or equal to about 25, less than or equal to about 20, less than or equal to about 15, less than or equal to about 10, or less than or equal to about 5.

Combinations of the above-referenced ranges are also possible (e.g., greater than or equal to about 1 and less than or equal to about 100, greater than or equal to about 1 and less than or equal to about 70). Other values are also possible.

In some embodiments, filter media 10 may be used to meet certain particulate efficiency standards (e.g., ASTM F838-05) while also having desirable structural (e.g., peel strength) and performance properties (e.g., water permeability, dirt holding capacity. For instance, the similarities between the first fiber web to the second fiber web may impart beneficial properties to the filter media. For instance, in some embodiments, similarity in water contact angle, critical surface tension, and/or critical wetting surface tension, may increase the strength of the adherence between the first and second fiber webs before and/or after a bonding process (e.g., calendering).

In some instances, the first and second fiber webs may be strongly adhered to each other. For instance, the peel strength between the first and second fiber webs may be greater than or equal to about 0.01 lb/in, greater than or equal to about 0.05 lb/in, greater than or equal to about 1 lb/in, greater than or equal to about 1.5 lb/in, greater than or equal to about 2 lb/in, greater than or equal to about 2.5 lb/in, greater than or equal to about 3 lb/in, greater than or equal to about 3.5 lb/in, greater than or equal to about 4 lb/in, greater than or equal to about 4.5 lb/in, greater than or equal to about 5 lb/in, greater than or equal to about 5.5 lb/in, greater than or equal to about 6 lb/in, greater than or equal to about 6.5 lb/in, greater than or equal to about 7 lb/in, greater than or equal to about 7.5 lb/in, greater than or equal to about 8 lb/in, greater than or equal to about 8.5 lb/in, or greater than or equal to about 9 lb/in.

In some instances, the peel strength between the first and second fiber webs is less than or equal to about 10 lb/in, less than or equal to about 9.5 lb/in, less than or equal to about 9 lb/in, less than or equal to about 8.5 lb/in, less than or equal to about 8 lb/in, less than or equal to about 7.5 lb/in, less than or equal to about 7 lb/in, less than or equal to about 6.5 lb/in, less than or equal to about 6 lb/in, less than or equal to about 5.5 lb/in, less than or equal to about 5 lb/in, less than or equal to about 4.5 lb/in, less than or equal to about 4 lb/in, less than or equal to about 3.5 lb/in, less than or equal to about 3 lb/in, less than or equal to about 2.5 lb/in, less than or equal to about 2 lb/in, less than or equal to about 1.5 lb/in, less than or equal to about 1 lb/in, or less than or equal to about 0.5 lb/in.

Combinations of the above-referenced ranges are also possible (e.g., greater than or equal to about 0.01 lb/in and less than or equal to about 10 lb/in, greater than or equal to about 0.01 lb/in and less than or equal to about 5 lb/in, greater than or equal to about 0.01 lb/in and less than or equal to about 1 lb/in). Other values are also possible. Peel strength may be determined with A Thwing-Albert mechanical tester, model QC-1000 by conducting a 180 degree peel test as per ASTM D3330. A crosshead speed of 2 inches per minute was used to separate the first fiber web from the second fiber web.

In some embodiments, the filter media may have a solidity of less than or equal to about 50%, less than or equal to about 45%, less than or equal to about 40%, less than or equal to about 35%, less than or equal to about 30%, less than or equal to about 25%, less than or equal to about 20%, less than or equal to about 15%, or less than or equal to about 12%.

In some instances, the filter media may have a solidity of greater than or equal to about 10%, greater than or equal to about 15%, greater than or equal to about 20%, greater than or equal to about 25%, greater than or equal to about 30%, greater than or equal to about 35%, greater than or equal to about 40%, or greater than or equal to about 45%.

It should be understood that combinations of the above-reference ranges are possible (e.g., greater than or equal to about 10% and less than or equal to about 50%, greater than or equal to about 10% and less than or equal to about 30%).

In some embodiments, the porosity of the filter media may be greater than or equal to about 50%, greater than or equal to about 55%, greater than or equal to about 60%, greater than or equal to about 65%, greater than or equal to about 70%, greater than or equal to about 75%, greater than or equal to about 80%, or greater than or equal to about 85%.

In some instances, the porosity of the filter media may be less than or equal to about 90%, less than or equal to about 85%, less than or equal to about 80%, less than or equal to about 75%, less than or equal to about 70%, less than or equal to about 65%, less than or equal to about 60%, or less than or equal to about 55%.

It should be understood that combinations of the above-reference ranges are possible (e.g., greater than or equal to about 50% and less than or equal to about 90%, greater than or equal to about 65% and less than or equal to about 90%).

In some embodiments, the filter media may have a basis weight of less than or equal to about 80 $g/m^2$, less than or equal to about 75 $g/m^2$, less than or equal to about 70 $g/m^2$, less than or equal to about 65 $g/m^2$, less than or equal to about 60 g/m², less than or equal to about 55 g/m², less than or equal to about 50 g/m², less than or equal to about 45 g/m², less than or equal to about 40 g/m², less than or equal to about 35 g/m², less than or equal to about 30 g/m², less than or equal to about 25 g/m², less than or equal to about 20 g/m², less than or equal to about 15 g/m², less than or equal to about 10 g/m², or less than or equal to about 8 g/m².

In some instances, the filter media may have a basis weight of greater than or equal to about 5 g/m², greater than or equal to about 10 g/m², greater than or equal to about 15 g/m², greater than or equal to about 20 g/m², greater than or equal to about 25 g/m², greater than or equal to about 30 g/m², greater than or equal to about 35 g/m², greater than or equal to about 40 g/m², greater than or equal to about 45 g/m², greater than or equal to about 50 g/m², greater than or equal to about 55 g/m², greater than or equal to about 60 g/m², greater than or equal to about 65 g/m², or greater than or equal to about 70 g/m².

Combinations of the above-referenced ranges are also possible (e.g., greater than or equal to about 5 g/m² and less than or equal to about 80 g/m², greater than or equal to about 5 g/m² and less than or equal to about 40 g/m², greater than or equal to about 10 g/m² and less than or equal to about 80 g/m², greater than or equal to about 10 g/m² and less than or equal to about 40 g/m²). Other values of basis weight are also possible.

In some embodiments, the filter media may have a surface area of greater than or equal to about 1 m²/g, greater than or equal to about 3 m²/g, greater than or equal to about 5 m²/g, greater than or equal to about 10 m²/g, greater than or equal to about 15 m²/g, greater than or equal to about 20 m²/g, greater than or equal to about 30 m²/g, greater than or equal to about 40 m²/g, greater than or equal to about 50 m²/g, greater than or equal to about 60 m²/g, greater than or equal to about 70 m²/g, greater than or equal to about 80 m²/g, or greater than or equal to about 90 m²/g.

In some instances, the filter media may have a surface area of less than or equal to about 100 m²/g, less than or equal to about 95 m²/g, less than or equal to about 90 m²/g, less than or equal to about 85 m²/g, less than or equal to about 80 m²/g, less than or equal to about 75 m²/g, less than or equal to about 70 m²/g, less than or equal to about 60 m²/g, less than or equal to about 50 m²/g, less than or equal to about 40 m²/g, less than or equal to about 30 m²/g, less than or equal to about 20 m²/g, or less than or equal to about 10 m²/g. It should be understood that combinations of the above-reference ranges are possible (e.g., greater than or equal to about 1 m²/g and less than or equal to about 100 m²/g, greater than or equal to about 3 m²/g and less than or equal to about 75 m²/g).

In some embodiments, the combination of structural features and similarity of certain properties of the first and second fiber webs may produce a filter media having improved and unexpected filtration performance. For instance, in some embodiments, the filter media may have a relatively high water permeability under a variety of conditions (e.g., pre- and/or post sterilization).

For instance, in some embodiments, the water permeability of the filter media and/or a fiber web may be greater than or equal to about 0.1 ml/min·cm²·psi, greater than or equal to about 0.2 ml/min·cm²·psi, greater than or equal to about 0.3 ml/min·cm²·psi, greater than or equal to about 0.5 ml/min·cm²·psi, greater than or equal to about 0.8 ml/min·cm²·psi, greater than or equal to about 1 ml/min·cm²·psi, greater than or equal to about 2 ml/min·cm²·psi, greater than or equal to 3 ml/min·cm²·psi, greater than or equal to about 4 ml/min·cm²·psi, greater than or equal to about 5 ml/min·cm²·psi, greater than or equal to about 6 ml/min·cm²·psi, greater than or equal to about 7 ml/min·cm²·psi, or greater than or equal to about 8 ml/min·cm²·psi.

In some instances, the water permeability of the filter media may be less than or equal to about 10 ml/min·cm²·psi, less than or equal to about 9 ml/min·cm²·psi, less than or equal to about 8 ml/min·cm²·psi, less than or equal to about 7 ml/min·cm²·psi, less than or equal to about 6 ml/min·cm²·psi, less than or equal to about 5 ml/min·cm²·psi, less than or equal to about 4 ml/min·cm²·psi, less than or equal to about 3 ml/min·cm²·psi, less than or equal to about 2 ml/min·cm²·psi, less than or equal to about 1 ml/min·cm²·psi, or less than or equal to about 0.5 ml/min·cm²·psi.

It should be understood that all combinations of the above-referenced ranges are possible (e.g., greater than or equal to about 0.1 ml/min·cm²·psi and less than or equal to about 10 ml/min·cm²·psi, greater than or equal to about 0.3 ml/min·cm²·psi and less than or equal to about 7 ml/min·cm²·psi). Other ranges are also possible.

Water permeability is the water flux divided by the pressure (e.g., 20 psi) used to determine the water flow rate. Water flow rate is measured by passing deionized water through a filter media or fiber web having an effective filtration area of 4.8 cm² at a pressure of 20 psi until 1,000 ml of water has been collected. The flow rate is determined by measuring the time until 1,000 ml of water has been collected. Water flux is calculated by dividing the flow rate (ml/min) by a sample effective area (cm²) of the fiber web (i.e., the area exposed to fluid flow) and is expressed in ml/min·cm². Prior to the water permeability test, a critical wetting surface tension test, as described herein, is performed on the sample. The first liquid in the series is deionized water. If the water droplets are not absorbed, the sample critical wetting surface tension is less than 72 dyne/cm. All samples whose critical wetting surface tension is less than 72 dyne/cm are conditioned as follows prior to measuring the water permeability. The filter media or fiber web is soaked in 70% isopropanol/water (v/v %) solution for 1 minute, and then soaked twice in deionized water for 1 minute. The media is then installed in a filter holder and 500 ml of deionized water is pumped through at 10 psi before proceeding with the water permeability test.

In some embodiments, the water permeability of the filter media may be relatively stable under a wide range of pressures. For instance, the difference in water permeability when a pressure of 20 psi is used to pass the water through the filter media and a pressure of 100 psi is used may be less than or equal to about 30% (e.g., less than or equal to about 25%, less than or equal to about 20%).

In some embodiments, the water bubble point of the filter media and/or a fiber web prior to a sterilization process may be greater than or equal to about 60 psi, greater than or equal to about 65 psi, greater than or equal to about 70 psi, greater than or equal to about 75 psi, greater than or equal to about 80 psi, greater than or equal to about 85 psi, greater than or equal to about 90 psi, or greater than or equal to about 95 psi.

In some instances, the water bubble point may be less than or equal to about 100 psi, less than or equal to about 95 psi, less than or equal to about 90 psi, less than or equal to about 85 psi, less than or equal to about 80 psi, less than or equal to about 75 psi, less than or equal to about 70 psi, or less than or equal to about 60 psi.

Combinations of the above-referenced ranges are also possible (e.g., greater than or equal to about 60 psi and less than or equal to about 100 psi, greater than or equal to about 60 psi and less than or equal to about 90 psi). Other values of water bubble point are also possible. The water bubble point may be determined according to according to the standard ASTM F-316-80 Method B, BS6410.

In some embodiments, the water bubble point of the filter media and/or a fiber web post-sterilization may be greater than or equal to about 70 psi, greater than or equal to about 75 psi, greater than or equal to about 80 psi, greater than or equal to about 85 psi, greater than or equal to about 90 psi, greater than or equal to about 95 psi, greater than or equal to about 100 psi, greater than or equal to about 105 psi, greater than or equal to about 110 psi, or greater than or equal to about 115 psi.

In some instances, the water bubble point of the filter media and/or a fiber web post-sterilization may be less than or equal to about 120 psi, less than or equal to about 115 psi, less than or equal to about 110 psi, less than or equal to about 105 psi, less than or equal to about 100 psi, less than or equal to about 95 psi, less than or equal to about 90 psi, less than or equal to about 85 psi, less than or equal to about 80 psi, or less than or equal to about 75 psi.

Combinations of the above-referenced ranges are also possible (e.g., greater than or equal to about 70 psi and less than or equal to about 120 psi, greater than or equal to about 75 psi and less than or equal to about 100 psi). Other values of water bubble point are also possible.

The water bubble point post-sterilization may be determined as follows. First, the filter media is placed in a stainless steel filter holder (47 mm diameter) which is installed in a standard autoclave, and then sterilized using inline steam at 121° C. for 40 minutes at a pressure of 17 psi. After sterilization, the filter is allowed to air dry and subjected to a water bubble point test according to the standard ASTM F-316-80 Method B, BS6410.

In some embodiments, the bubble point of the filter media may increase by less than or equal to 50%, less than or equal to 45%, less than or equal to 40%, less than or equal to 35%, less than or equal to 30%, less than or equal to 25%, less than or equal to 20%, less than or equal to 15%, less than or equal to 10%, less than or equal to 5%, or less than or equal to 1% after sterilization.

In some embodiments, the dirt holding capacity of the filter media may be greater than or equal to about 500 g/m$^2$, greater than or equal to about 600 g/m$^2$, greater than or equal to about 750 g/m$^2$, greater than or equal to about 1,000 g/m$^2$, greater than or equal to about 1,250 g/m$^2$, greater than or equal to about 1,500 g/m$^2$, greater than or equal to about 1,750 g/m$^2$, greater than or equal to about 2,000 g/m$^2$, or greater than or equal to about 2,250 g/m$^2$.

In some instances, the dirt holding capacity of the filter media may be less than or equal to about 2,500 g/m$^2$, less than or equal to about 2,400 g/m$^2$, less than or equal to about 2,250 g/m$^2$, less than or equal to about 2,000 g/m$^2$, less than or equal to about 1,750 g/m$^2$, less than or equal to about 1,500 g/m$^2$, less than or equal to about 1,250 g/m$^2$, less than or equal to about 1,000 g/m$^2$, or less than or equal to about 750 g/m$^2$.

Combinations of the above-referenced ranges are also possible (e.g., greater than or equal to about 500 g/m$^2$ and less than or equal to about 2,500 g/m$^2$, greater than or equal to about 750 g/m$^2$ and less than or equal to about 2,000 g/m$^2$). Other values are also possible. The dirt holding capacity may be determined by using a modified version of EN-14332-2. Briefly, the dirt holding capacity test consisted of flowing through the filter media an aqueous dispersion of fine clay dust Jetfine 1A at a concentration of 100 mg/L. The flow rate was held constant at 1 liter per minute and the sample effective area was equal to 95 cm$^2$. The filtration test was stopped when the pressure drop generated across the media rises—due to clogging-up to 1.6 bars. The weight gain due to fouling was determined by weighing the sample mass, in a dry state, before and after the filtration step.

As noted above, filter media 10, described herein, may be used for a wide range of applications that may require a certain level of particulate efficiency. Particulate efficiency may be determined by measuring the penetration of certain particles (e.g., colony forming units for microorganisms) through a fiber web and/or a filter media. Penetration is defined as Penetration=(C/C$_0$), where C is the particle concentration after passage through the filter and C$_0$ is the particle concentration before passage through the filter. Typical tests of penetration of microorganisms involve filtering bacteria particles through a filter media or fiber web and measuring the number of colony forming bacteria units (CFU) that penetrate through the filter media or fiber web. Particulate efficiency is defined 100−(Penetration*100).

In some embodiments, the filter media may still have a relatively high particulate efficiency. For instance, in some embodiments, the particulate efficiency may be greater than or equal to about 99%, greater than or equal to about 99.5%, greater than or equal to about 99.9%, greater than or equal to about 99.95%, greater than or equal to about 99.99%, greater than equal to about 99.995%, greater than or equal to about 99.999%, or greater than or equal to about 99.9995%.

In some instances, the filter media and/or a fiber web may have a particulate efficiency of less than 100%, less than or equal to about 99.99999%, less than or equal to about 99.999%, less than or equal to about 99.99%, less than or equal to about 99.997%, less than or equal to about 99.995%, or less than or equal to about 99.9%.

Combinations of the above referenced ranges are also possible (e.g., greater than or equal to about 99% and less than 100%). The particulate efficiency may be measured according to EN1822 for air filtration. Briefly, EN1822 is a DOP penetration test that involves exposing the filter media or layer to DOP aerosol particles approximately 0.3 microns in diameter at a media face velocity of approximately 5.3 cm/sec. The media face velocity is the velocity of air as it hits the upstream side of the filter media. The DOP penetration measured under these test conditions can be determined using any suitable instrument, such as a TDA100P Penetrometer.

In some embodiments, a fiber web and/or filter media may be designed for sterile filtration. In some such embodiments, the particulate efficiency may be very high (e.g., greater than or equal to about 99.999%). In some embodiments, the particulate efficiency of the filter media and/or a fiber web may be expressed in terms of Log Reduction Value (i.e., LRV), which is a quantitative measure of microorganism retention by a fiber web or filter media. LRV is the logarithm of Pentration$^{-1}$ and is expressed as follows:

$$LRV = \text{Log}\{[CFU]\text{challenge}/[CFU]\text{effluent}\}$$

wherein [CFU]challenge is the total number of bacteria in colony forming units in the fluid before passage through the filter media and/or a fiber web and [CFU]effluent is the total number of bacteria in colony forming units in the fluid after passage through the filter media and/or a fiber web.

LRV may be determined using ASTM F838-05. A filter media is considered sterile when the [CFU]effluent is zero; however, if the [CFU]effluent is zero, one is used in the above equation to calculate LRV. Briefly, *Brevundimonas diminuta* at a concentration of 10$^7$ CFU/1 cm$^2$ of sample area for a 76 cm² sample area may be used as the challenge. Therefore, the [CFU]challenge is 7.6×10⁸. An LRV of 8.88 is considered sterile. In some embodiments, the filter media and/or a fiber web may have an LRV of 8.88.

In general, any fiber web in the filter media, and accordingly the filter media, may include any suitable fiber type. In some embodiments, one or more fiber web (e.g., first fiber web) and/or the entire filter media may include a single fiber type (e.g., synthetic fibers). For example, in certain embodiments, one or more fiber web and/or the entire filter media may include synthetic fibers (e.g., nylon, silica, rayon, Lyocell, polyvinylidene fluoride, fluoropolymer, polypropylene, polyethersulfone, polyethylene terephthalate, polybutylene terephthalate) as described herein.

In some embodiments, the fibers in a fiber web (e.g., first fiber web, second fiber web) may have an average length which may depend on the method of formation of the fibers. For instance, in some embodiments, fibers formed by an electrospinning (e.g., solvent electrospinning, melt electrospinning), a melt-blown, a meltspun, or a centrifugal spinning process may be continuous (e.g., greater than about 5 cm, greater than about 50 cm, greater than about 200 cm).

In some embodiments, filter media 10 may comprise synthetic fibers. For instance, in some embodiments, first fiber web 15 and/or second fiber web 20 may comprise synthetic fibers. The synthetic fibers may have a relatively small average fiber diameter (e.g., less than or equal to about 2 microns). For instance, the synthetic fibers in first fiber web 15 may have an average diameter of less than or equal to about 0.5 microns (e.g., between about 0.05 microns and 0.5 microns). In some embodiments, the synthetic fibers in first fiber web 15, second fiber web 20, and/or filter media 10 may be continuous fibers formed by any suitable process (e.g., a melt-blown, a meltspun, an electrospinning, centrifugal spinning process). In certain embodiments, the synthetic fibers may be formed by an electrospinning process (e.g., melt electrospinning, solvent electrospinning). In other embodiments, the synthetic fibers may be non-continuous. In some embodiments, all of the fibers in the filter media are synthetic fibers. In certain embodiments, all of the fibers in first fiber web 15 and/or second fiber web 20 are synthetic fibers.

Synthetic fibers may include any suitable type of synthetic polymer. Examples of suitable synthetic fibers include polyimide, aliphatic polyamide (e.g., nylon 6), aromatic polyamide, polysulfone, cellulose acetate, polyether sulfone, polyaryl ether sulfone, modified polysulfone polymers, modified polyethersulfone polymers, polymethyl methacrylate, polyacrylonitrile, polyurethane, poly(urea urethane), polybenzimidazole, polyetherimide, polyacrylonitrile, poly(ethylene terephthalate), polypropylene, silicon dioxide (silica), regenerated cellulose (e.g., Lyocell, rayon,) carbon (e.g., derived from the pyrolysis of polyacrilonitrile), polyaniline, poly(ethylene oxide), poly(ethylene naphthalate), poly(butylene terephthalate), styrene butadiene rubber, polystyrene, poly(vinyl chloride), poly(vinyl alcohol), poly(vinylidene fluoride), fiberglass, poly(vinyl butylene) and copolymers or derivative compounds thereof, and combinations thereof. In some embodiments, the synthetic fibers are organic polymer fibers. Synthetic fibers may also include multi-component fibers (i.e., fibers having multiple compositions such as bicomponent fibers). In some cases, synthetic fibers may include electrospun (e.g., melt, solvent), meltblown, meltspun, or centrifugal spun fibers, which may be formed of polymers described herein (e.g., polyester, polypropylene). In some embodiments, synthetic fibers may be electrospun fibers. The filter media, as well as each of the fiber webs within the filter media, may also include combinations of more than one type of synthetic fiber. It should be understood that other types of synthetic fiber types may also be used.

In some cases, the synthetic fibers (e.g., in the first and/or second fiber webs) may be continuous (e.g., electrospun fibers, meltblown fibers, spunbond fibers, centrifugal spun fibers, etc.). For instance, synthetic fibers may have an average length of at least about 5 cm, at least about 10 cm, at least about 15 cm, at least about 20 cm, at least about 50 cm, at least about 100 cm, at least about 200 cm, at least about 500 cm, at least about 700 cm, at least about 1000 cm, at least about 1500 cm, at least about 2000 cm, at least about 2500 cm, at least about 5000 cm, at least about 10000 cm; and/or less than or equal to about 10000 cm, less than or equal to about 5000 cm, less than or equal to about 2500 cm, less than or equal to about 2000 cm, less than or equal to about 1000 cm, less than or equal to about 500 cm, or less than or equal to about 200 cm. Combinations of the above-referenced ranges are also possible (e.g., greater than or equal to about 100 cm and less than or equal to about 2500 cm). Other values of average fiber length are also possible.

In other embodiments, the synthetic fibers are not continuous (e.g., staple fibers). In general, synthetic non-continuous fibers may be characterized as being shorter than continuous synthetic fibers. For instance, in some embodiments, synthetic fibers in one or more fiber webs (e.g., second fiber web) in the filter media may have an average length of at least about 0.1 mm, at least about 0.5 mm, at least about 1.0 mm, at least about 1.5 mm, at least about 2.0 mm, at least about 3.0 mm, at least about 4.0 mm, at least about 5.0 mm, at least about 6.0 mm, at least about 7.0 mm, at least about 8.0 mm, at least about 9.0 mm, at least about 10.0 mm, at least about 12.0 mm, at least about 15.0 mm; and/or less than or equal to about 15.0 mm, less than or equal to about 12.0 mm, less than or equal to about 10.0 mm, less than or equal to about 5.0 mm, less than or equal to about 4.0 mm, less than or equal to about 1.0 mm, less than or equal to about 0.5 mm, or less than or equal to about 0.1 mm. Combinations of the above-referenced ranges are also possible (e.g., at least about 1.0 mm and less than or equal to about 4.0 mm). Other values of average fiber length are also possible.

In some embodiments in which synthetic fibers are included in one or more fiber webs and/or the entire filter media, the weight percentage of synthetic fibers in one or more fiber webs (e.g., first fiber web, second fiber web) and/or the entire filter media may be greater than or equal to about 1%, greater than or equal to about 20%, greater than or equal to about 40%, greater than or equal to about 60%, greater than or equal to about 75%, greater than or equal to about 90%, or greater than or equal to about 95%.

In some instances, the weight percentage of synthetic fibers in the second fiber web may be less than or equal to about 100%, less than or equal to about 98%, less than or equal to about 85%, less than or equal to about 75%, less than or equal to about 50%, or less than or equal to about 10%.

Combinations of the above-referenced ranges are also possible (e.g., greater than or equal to about 75% and less than or equal to about 100%). Other values of weight percentage of synthetic fibers are also possible. In some embodiments, one or more fiber webs (e.g., first fiber web, second fiber web) and/or the entire filter media includes 100% synthetic fibers.

In one set of embodiments, one or more fiber webs (e.g., second fiber web) in the filter media may include bicomponent fibers. The bicomponent fibers may comprise a thermoplastic polymer. Each component of the bicomponent fiber can have a different melting temperature. For example, the fibers can include a core and a sheath where the activation temperature of the sheath is lower than the melting temperature of the core. This allows the sheath to melt prior to the core, such that the sheath binds to other fibers in the fiber web, while the core maintains its structural integrity. The core/sheath binder fibers can be concentric or non-concentric. Other exemplary bicomponent fibers can include split fiber fibers, side-by-side fibers, and/or "island in the sea" fibers.

In some embodiments, bicomponent fibers may have an average length of at least about 0.1 mm, at least about 0.5 mm, at least about 1.0 mm, at least about 1.5 mm, at least about 2.0 mm, at least about 3.0 mm, at least about 4.0 mm, at least about 5.0 mm, at least about 6.0 mm, at least about 7.0 mm, at least about 8.0 mm, at least about 9.0 mm, at least about 10.0 mm, at least about 12.0 mm, at least about 15.0 mm; and/or less than or equal to about 15.0 mm, less than or equal to about 12.0 mm, less than or equal to about 10.0 mm, less than or equal to about 5.0 mm, less than or equal to about 4.0 mm, less than or equal to about 1.0 mm, less than or equal to about 0.5 mm, or less than or equal to about 0.1 mm. Combinations of the above-referenced ranges are also possible (e.g., at least about 1.0 mm and less than or equal to about 4.0 mm). Other values of average fiber length are also possible.

In some embodiments in which bicomponent fibers are included in one or more fiber webs (e.g., second fiber web) and/or the entire filter media, the weight percentage of bicomponent fibers in one or more fiber webs and/or the entire filter media may be, for example, greater than or equal to about 1%, greater than or equal to about 5%, greater than or equal to about 10%, greater than or equal to about 15%, greater than or equal to about 30%, or greater than or equal to about 45%.

In some instances, the weight percentage of bicomponent fibers in one or more fiber webs and/or the entire filter media may be less than or equal to about 70%, less than or equal to about 50%, less than or equal to about 25%, less than or equal to about 10%, less than or equal to about 5%, or less than or equal to about 1%.

Combinations of the above-referenced ranges are also possible (e.g., greater than or equal to about 30% and less than or equal to about 70%). Other values of weight percentage of the bicomponent fibers are also possible. In other embodiments, one or more fiber webs (e.g., second fiber web) and/or the entire filter media may include 0% bicomponent fibers.

In some embodiments, the composition of the first and second fiber webs may be selected such that the fiber webs have a similar water contact angle, critical surface tension, and/or critical wetting surface tension. Non-limiting examples of fiber compositions for the first fiber web and the second fiber web (expressed as first fiber web composition/second fiber web composition) include nylon 6/nylon 6, nylon 6/polybutylene terephthalate, polyethersulfone/polybutylene terephthalate, polyethersulfone/polyethylene terephthalate, polyvinylidene fluoride/fluoropolymer, silica/fiberglass, carbon/carbon, regenerated cellulose (e.g., rayon, Lyocell)/regenerated cellulose, and propropylene/propropylene.

In some embodiments, one or more fiber webs and/or the entire filter media, in addition to a plurality of fibers, may also include other components, such as a resin, surface treatments, and/or additives. In general, any suitable resin may be used to achieve the desired properties. For example, the resin may be polymeric, water-based, solvent-based, dry strength, and/or wet strength. Typically, any additional components are present in limited amounts.

In some embodiments, at least a portion of the fibers of one or more fiber web may be coated with a resin without substantially blocking the pores of the fiber web. In some embodiments, one or more fiber webs or the entire filter media described herein include a resin.

In some embodiments, the resin may be a binder resin. The binder resin is not in fiber form and is to be distinguished from binder fiber (e.g., multi-component fiber) described above. In general, the binder resin may have any suitable composition. For example, the binder resin may comprise a thermoplastic (e.g., acrylic, polyvinylacetate, polyester, polyamide), a thermoset (e.g., epoxy, phenolic resin), or a combination thereof. In some cases, a binder resin includes one or more of a vinyl acetate resin, an epoxy resin, a polyester resin, a copolyester resin, a polyvinyl alcohol resin, an acrylic resin such as a styrene acrylic resin, and a phenolic resin. Other resins are also possible.

As described further below, the resin may be added to the fibers in any suitable manner including, for example, in the wet state. In some embodiments, the resin coats the fibers and is used to adhere fibers to each other to facilitate adhesion between the fibers. Any suitable method and equipment may be used to coat the fibers, for example, using curtain coating, gravure coating, melt coating, dip coating, knife roll coating, or spin coating, amongst others. In some embodiments, the binder is precipitated when added to the fiber blend. When appropriate, any suitable precipitating agent (e.g., Epichlorohydrin, fluorocarbon) may be provided to the fibers, for example, by injection into the blend. In some embodiments, upon addition to the fibers, the resin is added in a manner such that one or more fiber web or the entire filter media is impregnated with the resin (e.g., the resin permeates throughout). In a multi-fiber web, a resin may be added to each of the fiber webs separately prior to combining the fiber webs, or the resin may be added to the fiber web after combining the fiber webs. In some embodiments, resin is added to the fibers while in a dry state, for example, by spraying or saturation impregnation, or any of the above methods. In other embodiments, a resin is added to a wet fiber web.

Filter media described herein may be produced using suitable processes, such as using a non-wet laid or a wet laid process. In some embodiments, a fiber web and/or the filter media described herein may be produced using a non-wet laid process, such as blowing or spinning process. In some embodiments, a fiber web (e.g., first fiber web, second fiber web) and/or the entire filter media may be formed by an electrospinning process. In some embodiments, electrospinning utilizes a high voltage differential to generate a fine jet of polymer solution from bulk polymer solution. The jet forms as the polymer is charged by the potential and electrostatic repulsion forces overcome the surface tension of the solution. The jet gets drawn into a fine fiber under the effect of repulsive electrical forces applied to the solution. The jet dries in flight and is collected on a grounded collector. The rapid solvent evaporation during this process leads to the formation of polymeric nanofiber which are randomly arranged into a web. In some embodiments, electrospun fibers are made using non-melt fiberization processes. Electrospun fibers can be made with any suitable polymers including but not limiting to, organic polymers, inorganic material (e.g., silica), hybrid polymers, and any combination thereof. In some embodiments, the synthetic fibers, described herein, may be formed from an electrospinning process.

In certain embodiments, a fiber web (e.g., first fiber web, second fiber web) and/or the entire filter media may be formed by a meltblowing system, such as the meltblown system described in U.S. Publication No. 2009/0120048, filed Nov. 7, 2008, and entitled "Meltblown Filter Medium", and U.S. Publication No. 2012-0152824, filed Dec. 17, 2010, and entitled, "Fine Fiber Filter Media and Processes", each of which is incorporated herein by reference in its entirety for all purposes. In certain embodiments, a fiber web (e.g., first fiber web, second fiber web) and/or the entire filter media may be formed by a meltspinning or a centrifugal spinning process.

In some embodiments, a non-wet laid process, such as an air laid or carding process, may be used to form one or more fiber webs. For example, in an air laid process, synthetic fibers may be mixed, while air is blown onto a conveyor. In a carding process, in some embodiments, the fibers are manipulated by rollers and extensions (e.g., hooks, needles) associated with the rollers. In some cases, forming the fiber webs through a non-wet laid process may be more suitable for the production of a highly porous media. In some embodiments, a non-wet laid process (e.g., electrospun, meltblown) may be used to form the first fiber web and a wet laid process may be used to from the second fiber web. The first fiber web and the second fiber web may be combined using any suitable process (e.g., lamination, calendering).

In some embodiments, a fiber web and/or the filter media described herein may be produced using a wet laid process. In general, a wet laid process involves mixing together of fibers of one or more type; for example, polymeric staple fibers of one type may be mixed together with polymeric staple fibers of another type, and/or with fibers of a different type (e.g., synthetic fibers and/or glass fibers), to provide a fiber slurry. The slurry may be, for example, aqueous-based slurry. In certain embodiments, fibers, are optionally stored separately, or in combination, in various holding tanks prior to being mixed together (e.g., to achieve a greater degree of uniformity in the mixture).

During or after formation of a filter media, the filter media may be further processed according to a variety of known techniques. For instance, a coating method may be used to include a resin in the filter media. Optionally, additional fiber webs can be formed and/or added to a filter media using processes such as lamination, co-pleating, or collation. For example, in some cases, two fiber webs (e.g., first fiber web and the second fiber web) are formed into a composite article by a wet laid process as described above, and the composite article is then combined with a third fiber web by any suitable process (e.g., lamination, co-pleating, or collation). It can be appreciated that a filter media or a composite article formed by the processes described herein may be suitably tailored not only based on the components of each fiber web, but also according to the effect of using multiple fiber webs of varying properties in appropriate combination to form filter media having the characteristics described herein.

As described herein, in some embodiments two or more fiber webs of the filter media (e.g., first fiber web and the second fiber web) may be formed separately and combined by any suitable method such as lamination, calendering, collation, or by use of adhesives. The two or more fiber webs may be formed using different processes, or the same process. For example, each of the fiber webs may be independently formed by a non-wet laid process (e.g., meltblown process, melt spinning process, centrifugal spinning process, electrospinning process, dry laid process, air laid process), a wet laid process, or any other suitable process.

Different fiber webs may be adhered together by any suitable method. For instance, fiber webs may be adhered using compressive techniques (e.g., lamination). Fiber webs may also be adhered by chemical bonding, adhesive and/or melt-bonded to one another on either side.

Lamination may involve, for example, compressing two or more fiber webs (e.g., first and second fiber webs) together using a flatbed laminator or any other suitable device at a particular pressure and temperature for a certain residence time (i.e., the amount of time spent under pressure and heat). For instance, the pressure may be between about 5 psi to about 150 psi (e.g., between about 30 psi to about 90 psi, between about 60 psi to about 120 psi, between about 30 and 60 psi, or between about 90 psi and about 120 psi); the temperature may be between about 75° F. and about 400° F. (e.g., between about 75° F. and about 300° F., between about 200° F. and about 350° F., or between about 275° F. and about 390° F.); and the residence time between about 1 second to about 60 seconds (e.g., between about 1 second to about 30 seconds, between about 10 second to about 25 seconds, or between about 20 seconds and about 40 seconds). Other ranges for pressure, temperature, and residence time are also possible.

Calendering may involve, for example, compressing two or more fiber webs (e.g., first and second fiber webs) together using calender rolls under a particular pressure, temperature, and line speed. For instance, the pressure may be between about 5 psi to about 150 psi (e.g., between about 30 psi to about 90 psi, between about 60 psi to about 120 psi, between about 30 and 60 psi, or between about 90 psi and about 120 psi); the temperature may be between about 75° F. and about 400° F. (e.g., between about 75° F. and about 300° F., between about 200° F. and about 350° F., or between about 275° F. and about 390° F.); and the line speed may be between about 5 ft/min to about 100 ft/min (e.g., between about 5 ft/min to about 80 ft/min, between about 10 ft/min to about 50 ft/min, between about 15 ft/min to about 100 ft/min, or between about 20 ft/min to about 90 ft/min). Other ranges for pressure, temperature, and line speed are also possible.

In some embodiments, further processing may involve pleating the filter media. For instance, two fiber webs may be joined by a co-pleating process. In some cases, the filter media, or various fiber webs thereof, may be suitably pleated by forming score lines at appropriately spaced distances apart from one another, allowing the filter media to be folded. In some cases, one fiber web can be wrapped around a pleated fiber web. It should be appreciated that any suitable pleating technique may be used.

In some embodiments, a filter media can be post-processed such as subjected to a corrugation process to increase surface area within the web. In other embodiments, a filter media may be embossed.

The filter media may include any suitable number of fiber webs, e.g., at least 2, at least 3, at least 4, at least 5, at least 6, at least 7 fiber webs. In some embodiments, the filter media may include up to 20 fiber webs.

In one set of embodiments, the filter media may include a first fiber web formed via an electrospinning process adhered (e.g., laminated) to a second fiber web formed via a meltblowing process. In such cases, the first fiber web may comprise polyamide, polyethersulfone, polyvinylidene fluoride, silica, carbon, regenerated cellulose, or propropylene fibers. The first fiber web may have an average fiber diameter of greater than or equal to about 0.01 microns and less than or equal to about 0.5 microns (e.g., greater than or equal to about 0.05 microns and less than or equal to about 0.5 microns) and/or a porosity between about 70% and about 90%. The basis weight of the first fiber web may be greater than or equal to about 0.5 g/m$^2$ and less than or equal to about 10 g/m$^2$ (e.g., greater than or equal to about 1 g/m$^2$ and less than or equal to about 5 g/m$^2$) and/or the basis weight of the first fiber web may be less than or equal to about 25% of the basis weight of the second fiber web and/or the filter media. The first fiber web may have a surface area of greater than or equal to about 5 m$^2$/g and less than or equal to about 350 m$^2$/g (e.g., greater than or equal to about 5 m$^2$/g and less than or equal to about 70 m$^2$/g) and/or a maximum pore size of greater than or equal to about 0.05 microns and less than or equal to about 1 micron (e.g., greater than or equal to about 0.1 microns and less than or equal to about 0.8 microns).

The second fiber web may comprise polyamide, polybutylene terephthalate, polyethylene terephthalate, fluoropolymer, fiberglass, carbon, regenerated cellulose, or propropylene fibers. In such cases, The second fiber web may have a maximum pore size of greater than or equal to about 1 micron and less than or equal to about 70 microns (e.g., greater than or equal to about 3 microns and less than or equal to about 60 microns, greater than or equal to about 3 microns and less than or equal to about 30 microns) and/or the ratio of the average diameter of fibers in the second fiber web to the average diameter of fibers in the first fiber web is greater than or equal to about 1 and less than or equal to about 100 (e.g., greater than or equal to about 1 and less than or equal to about 70). In such embodiments, the second fiber web may have an average fiber diameter of greater than or equal to about 0.5 microns and less than or equal to about 20 microns (e.g., greater than or equal to about 0.5 microns and less than or equal to about 10 microns) and/or a porosity between about 50% and about 90% (e.g., greater than or equal to about 70% and less than or equal to about 90%). The second fiber web may have a basis weight greater than or equal to about 5 g/m$^2$ and less than or equal to about 70 g/m$^2$ (e.g., greater than or equal to about 10 g/m$^2$ and less than or equal to about 40 g/m$^2$) and/or a surface area of greater than or equal to about 5 m$^2$/g and less than or equal to about 350 m$^2$/g (e.g., greater than or equal to about 5 m$^2$/g to about and less than or equal to about 70 m$^2$/g).

The first and second fiber webs may have a similar critical wetting surface tension, critical surface tension, and/or water contact angle. The similarity between the first and second fiber webs may serve to enhance the adhesion between the first and second fiber webs as well as the structural stability of the filter media under various conditions and/or permeability to certain fluids. In such cases, the first and second fiber webs may differ in water contact angle by less than or equal to about 20° (e.g., less than or equal to about 15°), in critical surface tension by less than or equal to about 15 dynes/cm (e.g., less than or equal to about 7 dynes/cm) and/or differ in critical wetting surface tension by less than or equal to about 15 dynes/cm (e.g., less than or equal to about 5 dynes/cm).

The fiber compositions for the first fiber web and the second fiber web (expressed as first fiber web composition/second fiber web composition) include nylon/nylon, nylon/polybutylene terephthalate, polyethersulfone/polybutylene terephthalate, polyethersulfone/polyethylene terephthalate, polyvinylidene fluoride/fluoropolymer, silica/fiberglass, carbon/carbon, regenerated cellulose (e.g., rayon, Lyocell)/regenerated cellulose, and propropylene/propropylene. As noted above, the first fiber web may be formed from a electrospinning process and the second fiber web may be formed from a meltblowing process.

The filter media may retain a relatively high percentage of particles (e.g., microorganisms, virus particles, biological cells) while maintaining a relatively high permeability. The filter media may have a LRV of 8.88 according to ASTM F838-05 and/or a water permeability of greater than or equal to about 0.1 ml/min·cm$^2$·psi and less than or equal to about 10 ml/min·cm$^2$·psi (e.g., greater than or equal to about 0.3 ml/min·cm$^2$·psi and less than or equal to about 7 ml/min·cm$^2$·psi). The filter media may also have a peel strength between the first and second fiber webs of greater than or equal to about 0.01 lb/in and less than or equal to about 10 lb/in (e.g., greater than or equal to about 0.01 lb/in and less than or equal to about 5 lb/in) and/or the maximum pore size may change by less than or equal to about 20% (e.g., less than or equal to 10%) when exposed to various conditions (e.g., steam sterilization at 121° C. for 40 minutes at a pressure of 17 psi). The filter may have a dirt holding capacity of greater than or equal to about 500 g/m$^2$ and less than or equal to about 2,500 g/m$^2$ (greater than or equal to about 750 g/m$^2$ and less than or equal to about 2,000 g/m$^2$).

Filter media described herein may be used in an overall filtration arrangement or filter element. In some embodiments, one or more additional fiber webs or components are included with the filter media. Non-limiting examples of additional fiber webs (e.g., a third fiber web, a fourth fiber web) include a meltblown fiber web, a wet laid fiber web, a spunbond fiber web, a carded fiber web, an air-laid fiber web, a spunlace fiber web, a forcespun fiber web or an electrospun fiber web.

It should be appreciated that the filter media may include other parts in addition to the one or more fiber webs described herein. In some embodiments, further processing includes incorporation of one or more structural features and/or stiffening elements. For instance, the filter media may be combined with additional structural features such as polymeric and/or metallic meshes. In one embodiment, a screen backing may be disposed on the filter media, providing for further stiffness. In some cases, a screen backing may aid in retaining the pleated configuration. For example, a screen backing may be an expanded metal wire or an extruded plastic mesh.

In some embodiments, a fiber web described herein may be a non-woven web. A non-woven web may include non-oriented fibers (e.g., a random arrangement of fibers within the web). Examples of non-woven webs include webs made by wet-laid or non-wet laid processes as described herein. Non-woven webs also include papers such as cellulose-based webs.

In some embodiments, filter media can be incorporated into a variety of filter elements for use in various filtering applications. Exemplary types of filters include bioprocessing filters, chemical processing filters, industrial processing filters, medical filters (e.g., filters for blood), vent filters, air filters, and water filters. The filter media may be suitable for filtering gases or liquids. The water and/or air filters may be used for the removal of microorganisms, virus particles, and/or other contaminants. For instance, filter media suitable for water filtration may be used for the treatment of municipal water, residential water, and/or industrial water (e.g., mining water, cooling tower/boiler's water, nuclear water, ultra-pure water production for the semiconductor and biopharmaceutical industries).

Filter elements can also be in any suitable form, such as pleated filter, capsules, spiral wound elements, plate and frame devices, flat sheet modules, vessel bags, disc tube units, radial filter elements, panel filter elements, or channel flow elements. A radial filter element can include pleated filter media that are constrained within two open wire meshes in a cylindrical shape. During use, fluids can flow from the outside through the pleated media to the inside of the radial element.

In some cases, the filter element includes a housing that may be disposed around the filter media. The housing can have various configurations, with the configurations varying based on the intended application. In some embodiments, the housing may be formed of a frame that is disposed around the perimeter of the filter media. For example, the frame may be thermally sealed around the perimeter. In some cases, the frame has a generally rectangular configuration surrounding all four sides of a generally rectangular filter media. The frame may be formed from various materials, including for example, metal, polymers, or any combination of suitable materials. The filter elements may also include a variety of other features known in the art, such as stabilizing features for stabilizing the filter media relative to the frame, spacers, or any other appropriate feature.

The filter elements may have the same property values as those noted above in connection with the filter media. For example, the above-noted water permeability, maximum pore size, LRV, and/or structural stability may also be found in filter elements.

During use, the filter media mechanically trap contaminant particles on the filter media as fluid (e.g., water) flows through the filter media. The filter media need not be electrically charged to enhance trapping of contamination. Thus, in some embodiments, the filter media are not electrically charged. However, in some embodiments, the filter media may be electrically charged.

Example 1

This example describes the water permeability of a filter media including a first and a second fiber web, as described herein, under various pressures. The change in water permeability of the filter media from 10 psi to 60 psi was less about 25%, indicating that the filter media was structurally stable within this pressure range.

The filter media (i.e., filter media 1) included a first fiber web laminated to a second fiber web. The first fiber web included electrospun nylon 6 fibers having an average diameter of about 100 nm. The first fiber web had a basis weight of about 3.5 g/m$^2$ and a maximum pore size of about 0.30 microns. The second fiber web included meltblown nylon 6 fibers having an average diameter of about 5 microns. The second fiber web had a basis weight of about 29 g/m$^2$ and a maximum pore size of about 40 microns. The first and second fiber webs were laminated together using a pressure of about 44 psi and a temperature of about 275° F.

The water permeability of the filter media was determined as described above, except that the pressure used to pass the water through the filter media was varied. The water permeability for filter media 1 is shown in Table 1.

TABLE 1

Water Permeability of Filter Media 1

| Pressure (psi) | Water Permeability (ml/min · cm$^2$ · psi) |
|---|---|
| 10 | 5 |
| 20 | 4.8 |

TABLE 1-continued

Water Permeability of Filter Media 1

| Pressure (psi) | Water Permeability (ml/min · cm$^2$ · psi) |
|---|---|
| 40 | 4.25 |
| 60 | 4 |

The water flux through a filter media is expected to trend linearly with pressure in the absence of structural deformation or wetting issues. In such case, the water permeability (i.e., flux normalized by pressure) is expected to be fairly constant. In general, the water permeability of a filter media directly relates to the porous structure of the filter media. Thus, relatively large changes in water permeability (e.g., greater than about 30%) with pressure are therefore indicative of structural defects (e.g., pore collapse, hole formation) as a result of the applied pressure. The change in water permeability of filter media 1 from 10 psi to 60 psi was less than about 25%, indicating that the filter media was structurally stable within this pressure range.

Comparative Example 1

This example describes the water permeability of a conventional filter media (i.e., filter media 2) including a first and second fiber web under various pressures. The filter media had a similar first fiber web as filter media 1 in Example 1, but the second fiber web differed in the maximum pore size, fiber composition, and method of formation. The maximum pore size of the second fiber web in filter media 2 was significantly larger than the second fiber web in filter media 1. The change in water permeability of the filter media from 10 psi to 60 psi was about 50%, indicating that the filter media was structurally unstable within this pressure range.

Filter media 2 included a first fiber web laminated to a second fiber web. The first fiber web included electrospun nylon 6 fibers having an average diameter of about 100 nm. The first fiber web had a basis weight of about 3 g/m$^2$ and a maximum pore size of about 0.3 micron. The second fiber web included spun bond polyethylene terephtalate fibers having an average diameter of about 20 microns. The second fiber web had a basis weight of the second fiber web was about 3.5 g/m$^2$ and a maximum pore size of about 100 microns. The first and second fiber webs were laminated as described in Example 1.

The water permeability of filter media 2 at various pressures was determined as described in Example 1 and is shown in Table 2.

TABLE 2

Water Permeability of Filter Media 2

| Pressure (psi) | Water Permeability (ml/min · cm$^2$ · psi) |
|---|---|
| 10 | 4.1 |
| 20 | 4.6 |
| 40 | 5 |
| 60 | 6 |

The change in water permeability of filter media 1 from 10 psi to 60 psi was about 50%, indicating that the filter media was structurally unstable within this pressure range. The high change in water permeability may be attributed to one or more deformations that affected the first fiber web. Since the maximum pore size of the second fiber web was relatively large, it is believed that the first and second webs did not have a sufficient number of contact points to allow for suitable adhesion between the fiber webs. As a result, the first fiber web lost its structural integrity at certain pressures.

Example 2

This example describes the water permeability, resistance, efficiency, and dirt holding capacity of filter media land two commercially available membrane filter media. Filter media 1 had superior performance properties compared to the membrane filter media.

Filter media 1 was formed as described in Example 1. The commercially available membrane filter media used were two different 0.2 microns polymer membranes (i.e., commercial 1 and commercial 2). The water permeability, resistance, efficiency, and dirt holding capacity are shown in Table 3. These measurements were conducted by International Filter Testing Services (IFTS, in Agen, France).

The resistance, retention efficiency and dirt holding capacity of these specimens were determined according to IFTS test protocol PQ20-V091211, which is adapted from EN 13443-2 standard. Specimens used in these tests are circular in shape and the effective area was 95 cm². The resistance was determined after recirculating deionized water at a constant flow rate of 1 liter per minute through the media for one hour and measuring the pressure drop across the filter. The water permeability was derived from the resistance by dividing flow rate by the pressure and the area of the filter media.

TABLE 3

Various Performance Properties of Filter Media

| | Resistance (bar) | Permeability (ml/min · cm² · psi) | Efficiency (%) | Dirt holding capacity (g/m²) |
|---|---|---|---|---|
| Filter Media 1 | 0.15 | 4.8 | 99.9 | 1585 |
| Commercial 1 | 0.26 | 2.77 | 87.5 | 1210 |
| Commercial 2 | 1.14 | 0.63 | 98.2 | 1158 |

Filter media 1 had a lower resistance, higher permeability, higher efficiency, and higher dirt holding capacity compared to both commercial membrane filters.

Example 3

This example describes the structural integrity and filtration performance of filter media 1 and filter media 2 after steam sterilization. The filtration performance of filter media 1 was maintained after steam sterilization. However, filter media 2 had a relatively low efficiency after sterilization.

Filter media 1 and 2 were formed as described in Examples 1 and 2, respectively. The bubble point for filter media 1 and filter media 2 was measured before and after sterilization. The filter media were sterilized as described earlier in the application. After sterilization, the microbial efficiency was determined according to ASTM F838-05. The results are shown in Table 4.

TABLE 4

Filter Media Properties Pre- and Post-Sterilization

| | Challenge (CFU) | Effluent (CFU) | LRV | Pre-Sterilization Bubble Point (psi) | Post-sterilization Bubble Point (psi) |
|---|---|---|---|---|---|
| Filter Media 1 | 7.6 × 10⁸ | <1 | 8.88 | 86 | 92 |
| Filter Media 2 | 7.6 × 10⁸ | 5.6 × 10⁵ | 3.13 | 84 | 62 |

Filter media 1 post-sterilization had an LRV greater than 8 and an increase in bubble point of about 7%. This rise in bubble point can be attributed to a better wetting of the media or to a slight swelling of the non-woven during steam exposure. Accordingly, filter media 1 was suitable for use in sterile filtration after sterilization. Conversely, filter media 2 had an LRV of about 3 and a decrease in bubble point of about −26%. This drop in bubble point was indicative of the occurrence of defects and loss of structural integrity. Accordingly, after sterilization filter media 2 was not suitable for sterile filtration.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A filter media, comprising:
   a first fiber web having an average fiber diameter of less than or equal to about 0.5 microns and a maximum pore size of less than or equal to about 1.0 microns; and
   a second fiber web having a maximum pore size of greater than or equal to about 3 microns and less than or equal to about 70 microns, wherein a critical wetting surface tension of the first fiber web and a critical wetting surface tension of the second fiber web differ by less than or equal to about 15 dynes/cm; and
   wherein the first fiber web has a water contact angle of greater than 90 degrees.

2. The filter media of claim 1, wherein the critical wetting surface tension of the first fiber web and the critical wetting surface tension of the second fiber web differ by less than or equal to about 5 dynes/cm.

3. The filter media of claim 1, wherein the first and second fiber webs are directly adjacent and have a peel strength of greater than or equal to about 0.01 lb/in and less than or equal to about 10 lb/in.

4. The filter media of claim 1, wherein the contact angle of the first fiber web and the contact angle of the second fiber web differ by less than or equal to about 20°.

5. The filter media of claim 1, wherein the porosity of the first fiber web is greater than or equal to about 70% and less than or equal to about 90%.

6. The filter media of claim 1, wherein the porosity of the second fiber web is greater than or equal to about 50% and less than or equal to about 90%.

7. The filter media of claim 1, wherein a ratio of an average fiber diameter of the second fiber web to an average fiber diameter of the first fiber web is greater than or equal to about 1 and less than or equal to about 70.

8. The filter media of claim 1, wherein the weight percentage of synthetic fibers in the first and/or second fiber webs is greater than or equal to about 80%.

9. The filter media of claim 8, wherein the synthetic fibers are selected from the group consisting of aliphatic polyamide, aromatic polyamide, regenerated cellulose, polyether sulfone, polyacrylonitrile, carbon, fiber glass, silica, poly (ethylene terephthalate), polypropylene, poly(butylene terephthalate), and poly(vinylidene fluoride).

10. The filter media of claim 1, wherein the first fiber web comprises continuous fibers.

11. The filter media of claim 1, wherein the second fiber web has an average fiber diameter of greater than or equal to about 0.5 microns and less than or equal to about 10 microns.

12. The filter media of claim 1, wherein the porosity of the filter media is greater than or equal to about 50% and less than or equal to about 90%.

13. The filter media of claim 1, wherein the basis weight of the filter media is greater than or equal to about 5 g/m² and less than or equal to about 50 g/m².

14. The filter media of claim 1, wherein the water permeability of the filter media is greater than or equal to about 0.1 ml/min·cm²·psi and less than or equal to about 10 ml/min·cm²·psi.

15. The filter media of claim 1, wherein the water bubble point of the filter media after sterilization is greater than or equal to about 70 psi and less than or equal to about 120 psi.

16. The filter media of claim 1, wherein the first fiber web comprises electrospun fibers.

17. The filter media of claim 1, wherein the second fiber web comprises meltblown fibers.

18. The filter media of claim 1, wherein the basis weight of the first fiber web is greater than or equal to about 0.5 g/m² and less than or equal to about 10 g/m².

19. The filter media of claim 1, wherein the basis weight of the first fiber web is less than or equal to 25% of the basis weight of the filter media.

20. The filter media of claim 1, wherein the surface area of the first fiber web is greater than or equal to about 5 m²/g and less than or equal to about 350 m²/g.

21. The filter media of claim 1, wherein the first fiber web comprises polyamide, polyethersulfone, polyvinylidene fluoride, silica, carbon, regenerated cellulose, or propropylene fibers.

22. The filter media of claim 1, wherein the second fiber web comprises polyamide, polybutylene terephthalate, polyethylene terephthalate, fluoropolymer, fiberglass, carbon, regenerated cellulose, or propropylene fibers.

23. The filter media of claim 1, wherein a dirt holding capacity of the filter media is greater than or equal to about 500 g/m² and less than or equal to about 2,500 g/m².

24. The filter media of claim 1, wherein the critical wetting surface tension of the first fiber web and the critical wetting surface tension of the second fiber web differ by greater than 0 dynes/cm.

25. The filter media of claim 1, wherein the basis weight of the first fiber web is less than or equal to 25% of the basis weight of the second fiber web.

26. The filter media of claim 1, wherein the second fiber web has a water contact angle of greater than 90 degrees.

27. A filter media, comprising:
   a first fiber web having an average fiber diameter of less than or equal to about 0.5 microns and a maximum pore size of less than or equal to about 1.0 microns; and
   a second fiber web having a maximum pore size of greater than or equal to about 3 microns and less than or equal to about 70 microns, wherein the first and second fiber webs are directly adjacent and have a peel strength of greater than or equal to about 0.01 lb/in and less than or equal to about 10 lb/in; and
   wherein the first fiber web has a water contact angle of greater than 90 degrees.

28. The filter media of claim 27, wherein the second fiber web has a water contact angle of greater than 90 degrees.

29. The filter media of claim 28, wherein the critical surface tension of the first fiber web and a critical wetting surface tension of the second fiber web differ by less than or equal to about 15 dynes/cm.

* * * * *

UNITED STATES PATENT AND TRADEMARK OFFICE
CERTIFICATE OF CORRECTION

PATENT NO. : 10,828,587 B2  
APPLICATION NO. : 14/690345  
DATED : November 10, 2020  
INVENTOR(S) : Abdoulaye Doucouré et al.

Page 1 of 1

It is certified that error appears in the above-identified patent and that said Letters Patent is hereby corrected as shown below:

In the Claims

Column 32, Claim 29, Line 35, "of claim 28" should be "of claim 27"

Signed and Sealed this  
Twenty-ninth Day of December, 2020

Andrei Iancu  
*Director of the United States Patent and Trademark Office*